(12) United States Patent
Tanaka et al.

(10) Patent No.: US 7,990,823 B2
(45) Date of Patent: Aug. 2, 2011

(54) STORAGE DEVICE AND ITS DRIVE STARTUP METHOD

(75) Inventors: Katsuya Tanaka, Kokubunji (JP); Shuji Nakamura, Machida (JP); Kentaro Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 567 days.

(21) Appl. No.: 12/173,414

(22) Filed: Jul. 15, 2008

(65) Prior Publication Data

US 2009/0274027 A1 Nov. 5, 2009

(30) Foreign Application Priority Data

May 1, 2008 (JP) .................................. 2008-119849

(51) Int. Cl.
*G11B 7/00* (2006.01)

(52) U.S. Cl. .................... 369/47.55; 369/47.5; 369/100; 711/114

(58) Field of Classification Search .................. None
See application file for complete search history.

(56) References Cited

U.S. PATENT DOCUMENTS 6,775,794 B1 * 8/2004 Horst et al. .................... 711/114
7,152,173 B2 * 12/2006 Yuan ............................. 711/114

FOREIGN PATENT DOCUMENTS

JP 4-078062 3/1992

* cited by examiner

*Primary Examiner* — Muhammad N Edun
(74) *Attorney, Agent, or Firm* — Brundidge & Stanger, P.C.

(57) ABSTRACT

The time required for starting up drives in a storage device mounted with both hard disk drives and solid state drives is shortened. A storage controller of the storage device identifies the type (HDD/SSD) of the mounted drives before starting up the drives. The storage controller thereafter performs staggered spinup to the HDDs in several batches. After the startup of HDDs is complete, the storage controller collectively starts up the SSDs. The storage controller determines the drive startup processing based on a pre-set drive startup policy such as reduction of the peak current reduction or shortening of the startup time, and the drive type identification result.

20 Claims, 21 Drawing Sheets

CHANNEL ADAPTER

STORAGE ADAPTER

FIG.7

| ENC ID 700 | SLOT ID 701 | HDD/SSD 702 | STARTUP 703 | DRIVE STARTUP POLICY 704 705 |
|---|---|---|---|---|
| 0 | 0 | 0 | 1 | 1 |
|   | 1 | 0 | 1 |   |
|   | 2 | 1 | 1 |   |
|   | 3 | 1 | 1 |   |
|   | 4 | 0 | 0 |   |
|   | 5 | 0 | 0 |   |
| 1 | 0 | 1 | 1 | 2 |
|   | 1 | 0 | 1 |   |
|   | 2 | 1 | 1 |   |
|   | 3 | 0 | 1 |   |
|   | 4 | 0 | 0 |   |
|   | 5 | 0 | 1 |   |
| 2 | 0 | 0 | 1 | 3 |
|   | 1 | 0 | 1 |   |
|   | 2 | 0 | 0 |   |
|   | 3 | 1 | 1 |   |
|   | 4 | 1 | 0 |   |
|   | 5 | 1 | 1 |   |

FIG.8

| MEDIA TYPE 800 801 | POWER SUPPLY VOLTAGE (V) 802 | HDD SLEEP/SSD SLEEP CURRENT VALUE (mA) 803 | HDD STARTUP/SSD IDLE CURRENT VALUE (mA) 804 | HDD IDLE/SSD ACTIVE CURRENT VALUE (mA) 805 |
|---|---|---|---|---|
| HDD | 12 | 20 | 2000 | 540 |
|     | 5  | 350 | 1200 | 500 |
| SSD | 12 | 0   | 0    | 0   |
|     | 5  | 350 | 400  | 600 |

STORAGE DEVICE AND ITS DRIVE STARTUP METHOD

CROSS-REFERENCES

This application relates to and claims priority from Japanese Patent Application No. 2008-119849, filed on May 1, 2008, the entire disclosure of which is incorporated herein by reference.

BACKGROUND

The present invention generally relates to a storage device and its drive startup method, and in particular can be suitably applied to a storage device loaded with a plurality of hard disk drives and a plurality of solid state drives, and its drive startup method.

A storage device generally comprises a random accessible nonvolatile storage media. This nonvolatile storage media is a magnetic disk, an optical disk or the like. Today, mainstream storage devices comprise a plurality of hard disk drives.

With this kind of storage device, in order to start up a hard disk drive and read/write the data recorded on a disk, it is necessary to rotate (spin) the built-in disk. The operation for starting the spinning of the disk is referred to as a "spinup," and the current consumed during the spinup is referred to as "spinup current." The spinup current is greater than the current consumption of a hard disk drive during steady rotation. Thus, the current consumption characteristic of a hard disk drive is an inrush current type in which the supply current during the startup is greater than during steady operation. Thus, if the spinup of a plurality of hard disk drives is started simultaneously, substantial supply current will be required.

As background art, Japanese Patent Laid-Open Publication No. H4-78062 discloses technology related to a drive startup method of a disk system.

SUMMARY

According to conventional technology, the drive startup method in a storage device mounted with a plurality of hard disk drives inhibits superposition of the hard disk drive inrush current by spinning up the hard disk drives in several batches. Moreover, in order to shorten the time required for spinning up all hard disk drives, the setting is configured such that the number of drives to be spun up in several batches is sequentially decreased.

Meanwhile, pursuant to the advancement of semiconductor technology, solid state drives using a nonvolatile semiconductor memory such as a flash memory as its storage media are being developed. A storage device that uses a solid state drive as its storage media is considered to be superior in comparison to a storage device comprising a plurality of hard disk drives in terms of service life, power saving, access time and so on.

This is because there is no flow of spinup current since a solid state drive does not incorporate a disk, and the current consumption characteristic of a solid state drive is an average current type in which the supply current does not differ greatly during startup and steady operation. In addition, since the current consumption of a solid state drive is smaller in comparison to a hard disk drive, more drives can be collectively started up in comparison to hard disk drives.

If the drive startup method of conventional technology is implemented in a storage device equipped with both hard disk drives and solid state drives, the hard disk drives and the solid state drives are treated the same. In other words, the solid state drives will also be subject to staggered spinup in several batches as with the hard disk drives. Thus, there is a problem in that more time is required until the startup of all drives is complete in comparison to the collective startup of the solid state drives.

Furthermore, if the solid state drives are started up before the startup of the hard disk drives, the spinup current of the hard disk drives and the current consumption of the started solid state drives will be superimposed, and there is a problem in that the peak current consumption will be greater in comparison to the case of performing staggered spinup only to the hard disk drives.

The present invention was made in view of the foregoing points. Thus, an object of the present invention is to propose a storage device and its drive startup method capable of shortening the drive startup time and reducing the peak current consumption in a storage device mounted with a plurality of hard disk drives and a plurality of solid state drives.

The storage device of the present invention comprises a control unit such as a switch for enabling a storage controller to individually control the availability of power delivery to a hard disk drive or a solid state drive included in a plurality of drives connected to the same power source. The storage controller identifies whether each drive included in the plurality of drives is a hard disk drive or a solid state drive before starting the spinup processing of a hard disk drive, determines the number of hard disk drives to be subject to simultaneous spinup for each of the plurality of drives based on the identification result, and executes drive startup processing for each of the plurality of drives.

The storage device of the present invention starts the power delivery to a solid state drive included in the plurality of drives after the spinup processing of all hard disk drives included in the plurality of drives is complete.

With the storage device configured as described above, since the storage controller identifies the media type of the drives and starts up the drives by separating a plurality of hard disk drives to be subject to staggered spinup and a plurality of solid state drives to be subject to collective startup, it is possible to shorten the time required for starting up all drives. In addition, the storage device is able to inhibit the peak current consumption during the startup of drives since the inrush current of the hard disk drives and the current consumption of solid state drives will not be superimposed.

According to the present invention, it is possible to propose a storage device and its drive startup method capable of shortening the drive startup time and reducing the peak current consumption in a storage device mounted with a plurality of hard disk drives and a plurality of solid state drives.

DESCRIPTION OF DRAWINGS

FIG. 7 is a diagram explaining a drive startup control management table according to an embodiment of the present invention;

FIG. 8 is a diagram explaining a drive current characteristics table according to an embodiment of the present invention;

DETAILED DESCRIPTION

An embodiment of the present invention is now explained with reference to the attached drawings.

Figure 1:
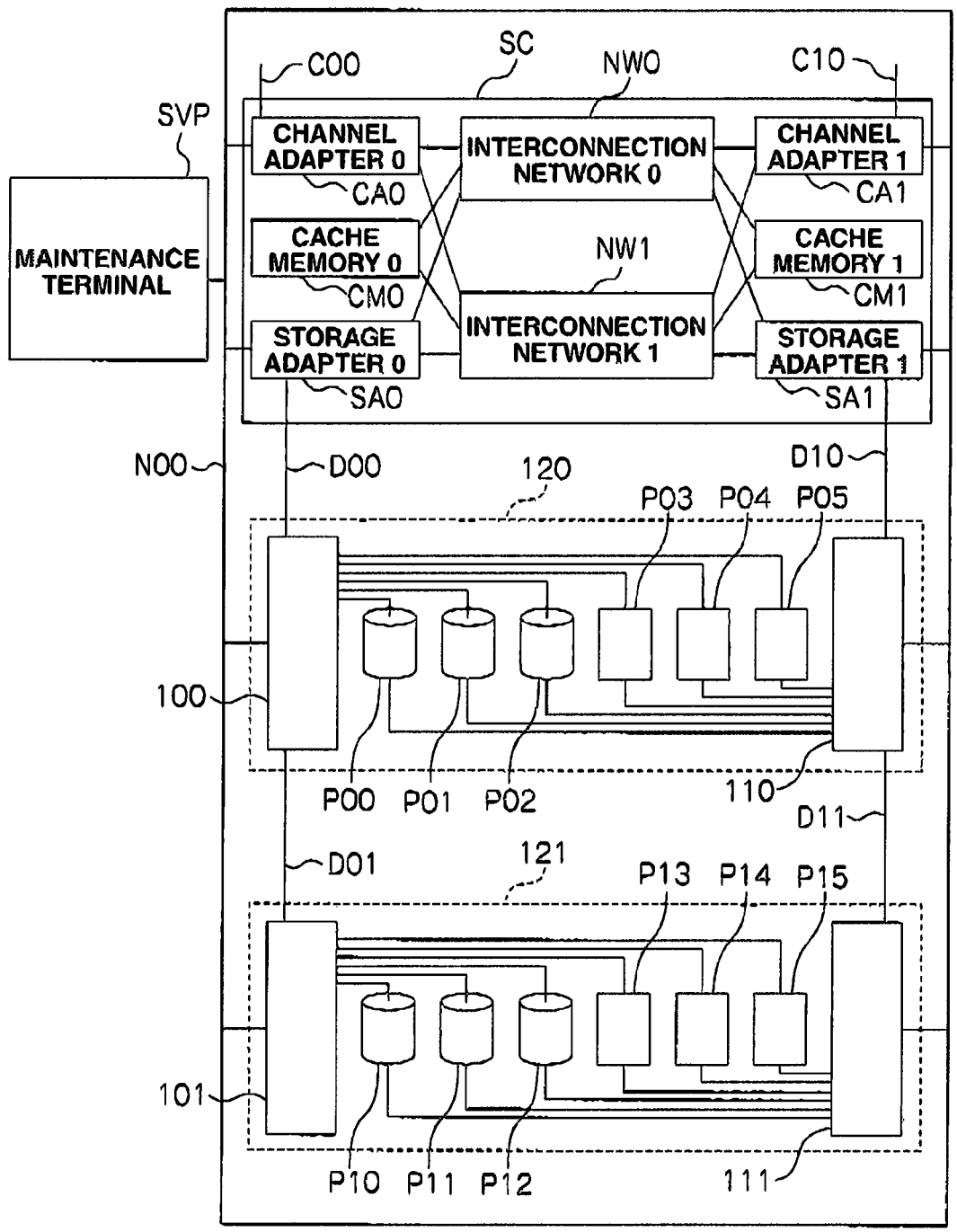
FIG. 1 is a block diagram of a storage device according to an embodiment of the present invention.

FIG. 1 is a block diagram of a storage device according to an embodiment of the present invention. The storage device comprises a storage controller SC, hard disk drives P00 to P02, P10 to P12, and solid state drives P03 to P05, P13 to P15.

The solid state drives are memory devices that use a flash memory or the like as its storage media.

The storage controller SC comprises channel adapters CA0, CA1, cache memories CM0, CM1, storage adapters SA0, SA1 and interconnection networks NW0, NW1. Although two channel adapters CA0, CA1, two cache memories CM0, CM1 and two storage adapters SA0, SA1 are illustrated in FIG. 1, there is no limit in the number of components that may be provided.

The interconnection networks NW0 and NW1 are switches or the like, and mutually connect the components that configure the storage controller SC. Specifically, the interconnection networks NW0 and NW1 mutually connect the channel adapter CA0, the cache memory CM0 and the storage adapter SA0. Similarly, the interconnection networks NW0, NW1 mutually connect the channel adapter CA1, the cache memory CM1 and the storage adapter SA1.

Figure 2:
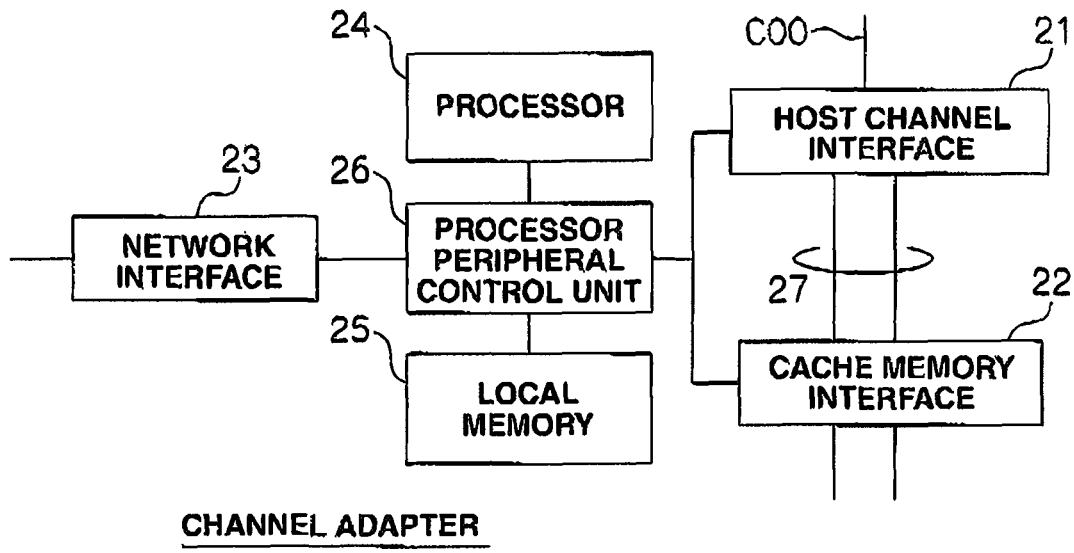
FIG. 2 is a block diagram of a channel adapter according to an embodiment of the present invention.

The channel adapter CA0, as explained later with reference to FIG. 2, is connected to an external host system (not shown) via a channel C00. Similarly, the channel adapter CA1 is connected to an external host system (not shown) via a channel C10. The host system is a computer that reads and writes data from and into the storage device of this embodiment.

The cache memories CM0, CM1 temporarily store data received from the channel adapters CA0, CA1 and the storage adapters SA0, SA1.

Figure 3:
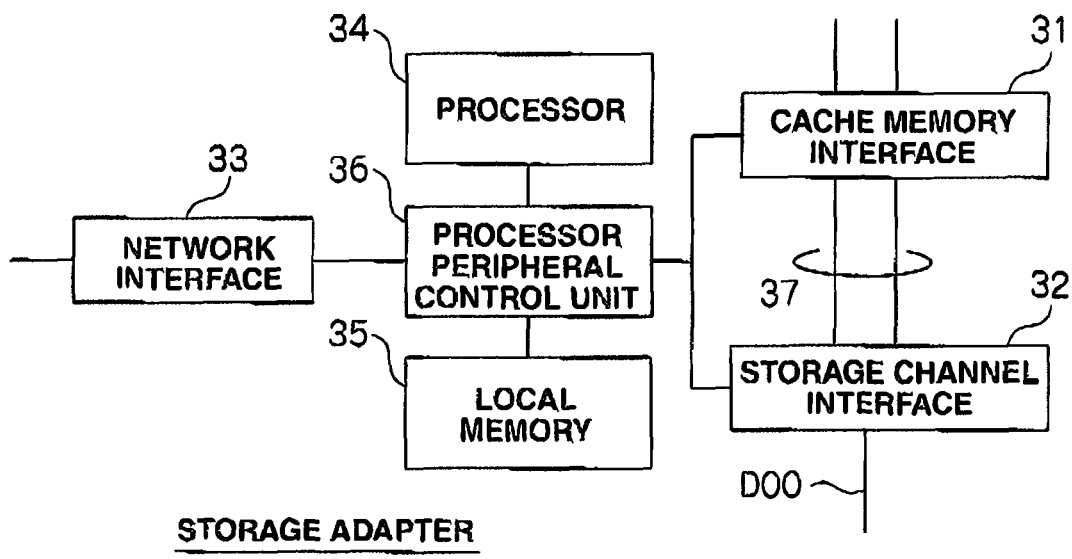
FIG. 3 is a block diagram of a storage adapter according to an embodiment of the present invention.

The storage adapter SA0, as explained later with reference to FIG. 3, is connected to the hard disk drive P00 and so on. Specifically, the storage adapter SA0 is connected to the hard disk drives P00 to P02 and the solid state drives P03 to P05 via a channel D00 and an expander 100. An expander is a SAS (Serial Attached SCSI) switch, and can be connected to a plurality of SAS drives or SATA (Serial ATA) drives. The storage adapter SA0 is also connected to the hard disk drives P10 to P12 and the solid state drives P13 to P15 via a channel D01 and an expander 101.

Similarly, the storage adapter SA1 is connected to the hard disk drive P00 and so on. Specifically, the storage adapter SA1 is connected to the hard disk drives P00 to P02 and the solid state drives P03 to P05 via a channel D10 and an expander 110. The storage adapter SA1 is also connected to the hard disk drives P10 to P12 and the solid state drives P13 to P15 via a channel D11 and an expander 111.

The channel adapters CA0, CA1, the storage adapters SA0, SA1 and the expanders 100, 101, 110, 111 are connected to a maintenance terminal SVP via a network N00. The maintenance terminal SVP sends the setting information input from the administrator of the storage device to the channel adapters CA0, CA1 or the storage adapters SA0, SA1 or the expanders 100, 101, 110, 111.

The storage device may also comprise a single adapter in substitute for the storage adapter SA0 and the channel adapter CA0. In this case, the foregoing adapter performs the processing of the storage adapter SA0 and the channel adapter CA0.

The hard disk drives P00 to P02 and the solid state drives P03 to P05 and the expanders 100, 110 are housed in an enclosure 120 together with a power source unit described later. Similarly, the hard disk drives P10 to P12 and the solid state drives P13 to P15 and the expanders 101, 111 are housed in an enclosure 121 together with a power source unit described later.

FIG. 2 is a block diagram of the channel adapter CA0. The channel adapter CA0 comprises a host channel interface 21, a cache memory interface 22, a network interface 23, a processor 24, a local memory 25 and a processor peripheral control unit 26.

The host channel interface 21 is an interface for connecting to an external host system (not shown) via a channel C00. The host channel interface 21 mutually converts a data transfer protocol on the channel C00 and an internal data transfer protocol of the storage controller SC.

The cache memory interface 22 is an interface for connecting the channel adapter CA0 and the interconnection networks NW0, NW1. The network interface 23 is an interface for connecting the channel adapter CA0 and the maintenance terminal SVP.

The host channel interface 21 and the cache memory interface 22 are connected with a signal line 27.

The processor 24 performs various types of processing by executing programs stored in the local memory 25. Specifically, the processor 24 controls the data transfer between the host system and the interconnection networks NW0, NW1.

The local memory 25 stores programs to be executed by the processor 24. The local memory 25 also stores tables to be referred to by the processor 24. These tables are set or changed by the administrator.

In this case, the administrator inputs information for setting or changing the tables in the maintenance terminal SVP. The maintenance terminal SVP sends the input information to the processor 24 via the network interface 23. The processor 24 creates or changes the tables based on the received information. The processor 24 thereafter stores the tables in the local memory 25.

The processor peripheral control unit 26 controls the data transfer among the host channel interface 21, the cache memory interface 22, the network interface 23, the processor 24 and the local memory 25. The processor peripheral control unit 26 is a chipset or the like. The channel adapter CA1 is configured the same as the channel adapter CA0, and the detailed explanation thereof is omitted.

FIG. 3 is a block diagram of the storage adapter SA0. The storage adapter SA0 comprises a cache memory interface 31, a storage channel interface 32, a network interface 33, a processor 34, a local memory 35 and a processor peripheral control unit 36.

The cache memory interface 31 is an interface for connecting the storage adapter SA0 and the interconnection networks NW0, NW1.

The storage channel interface 32 is an interface for connecting to the channel D00. The storage channel interface 32 also mutually converts a data transfer protocol on the channel D00 and an internal data transfer protocol of the storage controller SC.

The cache memory interface 31 and the storage channel interface 32 are connected with a signal line 37.

The network interface 33 is an interface for connecting the storage adapter SA0 and the maintenance terminal SVP.

The processor 34 performs various types of processing by executing programs stored in the local memory 35.

The local memory 35 stores programs to be executed by the processor 34. The local memory 35 also stores tables to be referred to by the processor 34. These tables are set or changed by the administrator.

In this case, the administrator inputs for setting or changing the tables in the maintenance terminal SVP. The maintenance terminal SVP sends the input information to the processor 34 via the network interface 33. The processor 34 creates or changes the tables based on the received information. The processor 34 thereafter stores the tables in the local memory 35.

The processor peripheral control unit 36 controls the data transfer among the cache memory interface 31, the storage channel interface 32, the network interface 33, the processor 34 and the local memory 35. The processor peripheral control unit 36 is a chipset or the like. The storage adapter SA1 is configured the same as the storage adapter SA0, and the detailed explanation thereof is omitted.

Figure 4:
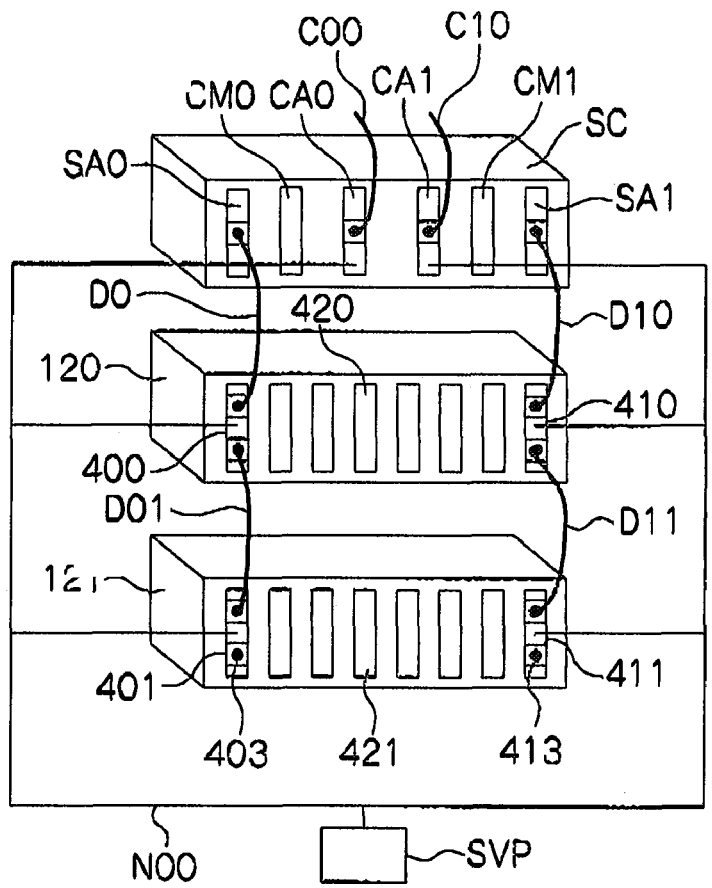
FIG. 4 is a diagram explaining a mode of a storage controller and an enclosure according to an embodiment of the present invention.

FIG. 4 is a diagram explaining a mode of the storage controller SC and the enclosures 120, 121 according to an embodiment of the present invention.

The storage controller SC is configured so that, when the storage adapters SA0, SA1 and the channel adapters CA0, CA1 and the cache memories CM0, CM1 malfunction, it is able to replace the malfunctioned component from the front side of the storage controller SC.

The enclosure 120 is configured so that an expander board 400 loaded with the expander 100 and an expander board 410 loaded with the expander 110 can be replaced if they malfunction. A drive cartridge with a built-in storage media described later is inserted into a drive slot 420. If the storage media malfunctions, the drive cartridge is removed from the drive slot 420 at the front side of the enclosure 120, and replaced with a normal component. Similarly, the enclosure 121 is configured so that an expander board 401 loaded with the expander 101 and an expander board 411 loaded with the expander 111 can be replaced if they malfunction.

A drive cartridge with a built-in storage media described later is inserted into a drive slot 421. If the storage media malfunctions, the drive cartridge is removed from the drive slot 421 at the front side of the enclosure 121, and replaced with a normal component.

Although FIG. 4 illustrates an example of connecting only two enclosures to the storage controller SC, if an enclosure is to be added and connected to the storage controller SC, the new expander is cascade-connected from the expander port 403 of the expander board 401 and the expander port 413 of the expander board 411.

Figure 5:
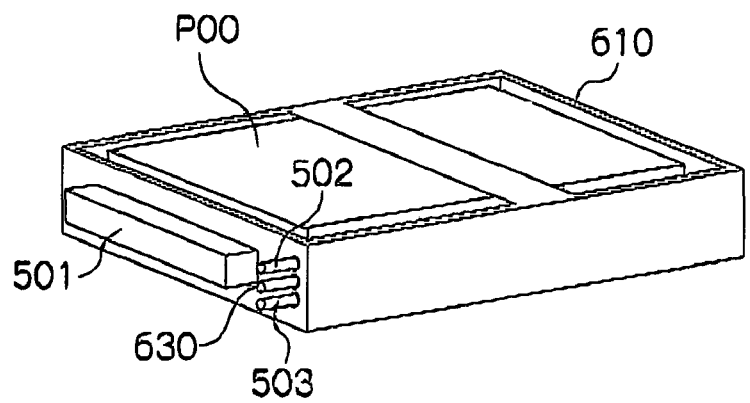
FIG. 5 is a diagram explaining a drive cartridge according to an embodiment of the present invention.

FIG. 5 is a diagram explaining a drive cartridge incorporating a hard disk drive or a solid state drive as its storage media. In FIG. 5, a hard disk drive P00 is built into the drive cartridge 610. Here, the hard disk drive P00 is a SATA drive. A SATA connector 501 of the drive cartridge 610 is connected identical or electrically to a SATA connector of the hard disk drive. The drive cartridge 610 comprises a drive type detection signal pin 630 that outputs a signal for identifying whether the built-in drive is a hard disk drive or a solid state drive. The drive type detection signal pin 630 selects and outputs a voltage signal input from either an input pin 502 or an input pin 503.

Figure 6:
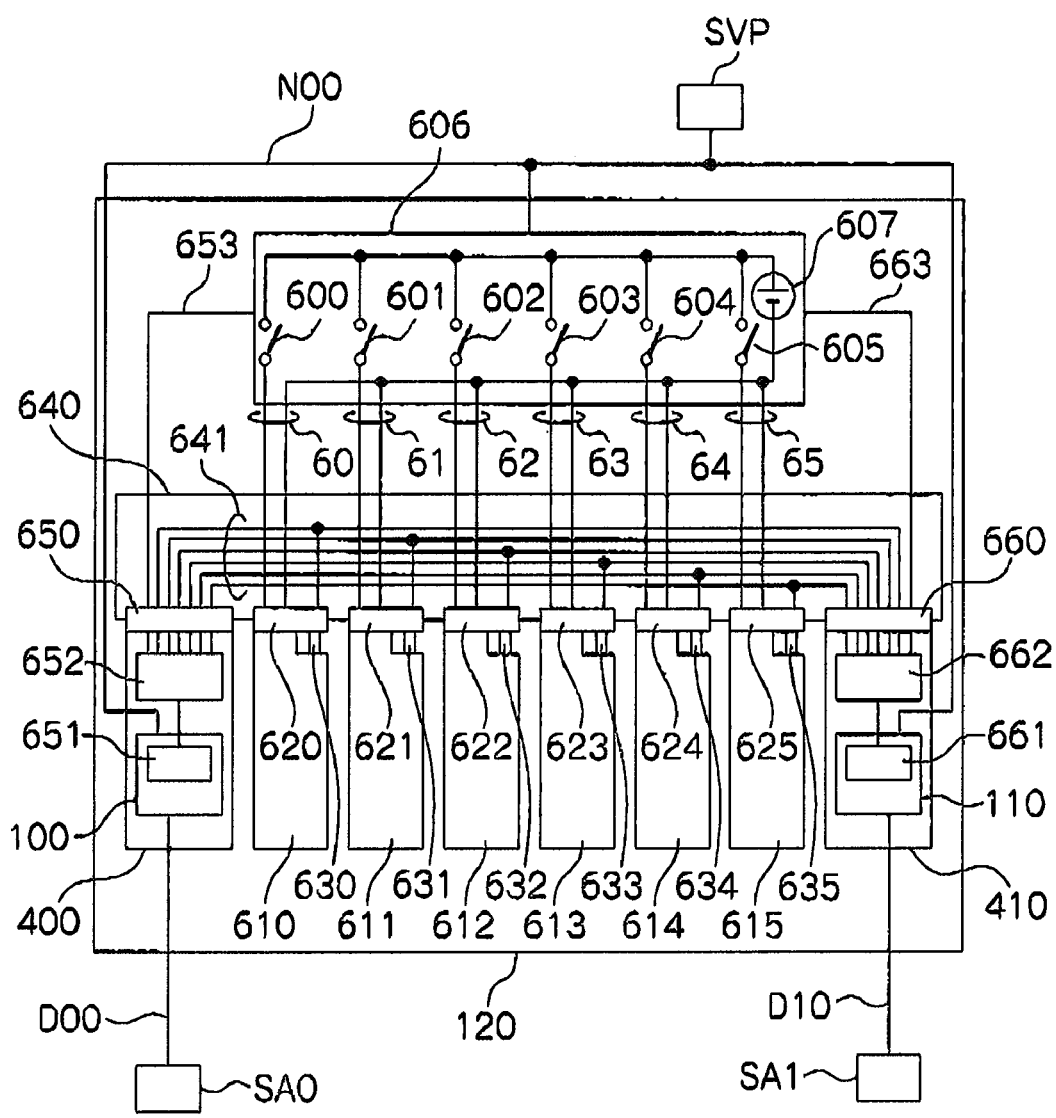
FIG. 6 is a block diagram of an enclosure according to an embodiment of the present invention.

FIG. 6 is a block diagram of the enclosure 120. However, only the components involved in the drive startup control are illustrated, and wiring and the like related to the reading and writing of data are omitted. The enclosure 120 includes a power source unit 606 and a backplane 640.

The power source unit 606 includes a voltage source 607, and switches 600 to 605 for controlling the power feed to the respective drives in the enclosure. Drive cartridges 610 to 615 with a built-in storage media are respectively connected to the backplane 640 via backplane connectors 620 to 625. Drive type detection signal pins 630 to 635 provided to the drive cartridges 610 to 615 are also connected to the wiring on the backplane 640 via the backplane connectors 620 to 625. Similarly, power source wires 60 to 65 from the power source unit 606 to the respective drive cartridges 611 to 615 are also wired via the backplane connectors 620 to 625.

The drive type detection signal pins 630 to 635 are connected to the expander board 400, 410 via a drive type detection signal line 641 on the backplane 640, and the backplane connectors 650, 660. The expander board 400 comprises an expander 100 and a drive startup control unit 652.

The drive startup control unit 652 is connected to the drive type detection signal line 641 via the backplane connector 650, determines the drive type detection signal from the respective drive cartridges 610 to 615, and identifies the type of drive built into the drive cartridges 610 to 615. The drive startup control unit 652 is connected to the power source unit 606 via the power control signal line 653 and controls the power feed to the respective drive cartridges 610 to 615 by switching the switches 600 to 605. The expander 100 has an SES (SCSI Enclosure Service) unit 651 built therein.

The SES unit 651 is a component for controlling an air-cooling fan, a temperature monitor and so on in the enclosure 120, and can be accessed from the storage controller SC via a virtual target device (not shown) in the expander 100.

In this embodiment, by connecting the SES unit 651 and the drive startup control unit 652, the storage controller SC is able to control the power feed to the drives via the storage adapter SA0 and the SES unit 651. The power source unit 606 and the expander 100 and the maintenance terminal SVP are connected via the network N00. Thus, the switches 600 to 605 in the power source unit 606 can also be controlled from the maintenance terminal SVP or the storage controller SC via the network N00.

The expander board 410, as with the expander board 400, comprises an expander 110 with a built-in SES unit 661, and a drive startup control unit 662. The drive startup control unit 662 is connected to the respective drive cartridges 610 to 615 via the backplane connector 660 and the drive type detection signal line 641, and also connected to the power source unit 606 via the backplane connector 660 and the power control wire 663. The drive startup control unit 662 is also able to control the power feed to the respective drives by switching the switches 600 to 605 in the power source unit 606.

FIG. 7 is a diagram explaining a drive startup control management table. The drive startup control management table 700 is retained in the local memory 35 of the storage adapters SA0, SA1, and can be changed and referred to from the maintenance terminal SVP. The drive startup control management table 700 stores an enclosure identifier 701, a drive slot identifier 702, a drive type 703, a startup flag 704, and a drive startup policy 705.

The enclosure identifier 701 is data for identifying the enclosure to be connected to the storage controller SC. The drive slot identifier 702 is data for identifying the drive slot of the respective enclosures. The drive type 703 stores 0 when the type of drive built into the drive cartridge inserted into the respective drive slots is a hard disk drive, and stores 1 if this is a solid state drive. The startup flag 704 shows whether to start up the respective drives upon starting up the storage system. The startup flag 704 stores 1 when starting up the drives and stores 0 when the drives are not to be started up or when nothing is inserted into the drive slot. The drive startup policy 705, as described in detail later, stores 1 in the case of a current saving drive startup policy, stores 2 in the case of a hard disk drive preferential startup policy, and stores 3 in the case of a state drive preferential startup policy.

The current characteristics and the drive startup policies during the startup of drives are now explained with reference to FIG. 8 to FIG. 13. FIG. 8 is a diagram explaining a drive current characteristics table. The drive current characteristics table 800 stores a drive type 801, a power supply voltage 802, and current consumption values 803 to 805 of each operational status. If the supply of a plurality of power supply voltages (12V, 5V, etc.) is required such as in the case of 3.5-inch hard disk drives, the current consumption is stored for each power supply voltage. In the case of solid state drives that only require the 5V power source, 0 is input as the current value of the 12V power source.

Figure 9:
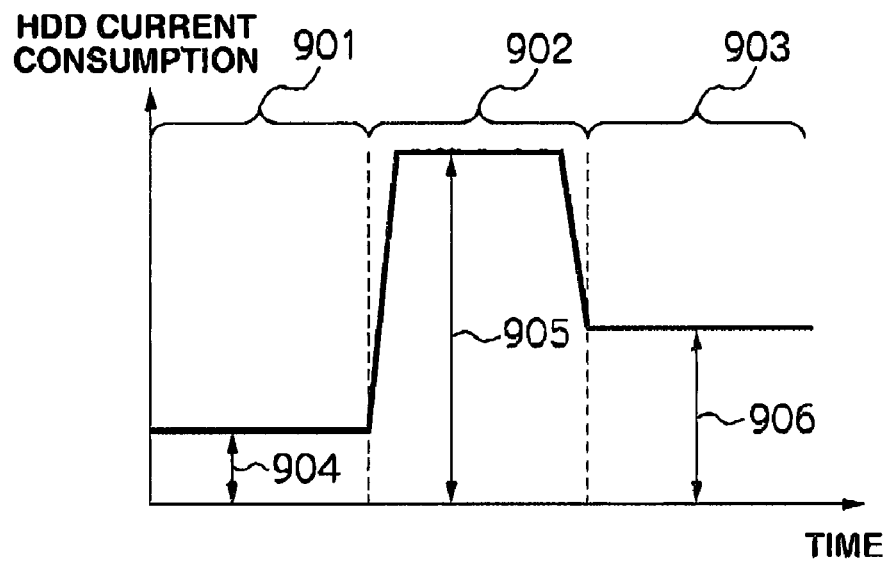
FIG. 9 is a diagram explaining the current consumption characteristics of a hard disk drive.

FIG. 9 is a diagram explaining the time change of current consumption from the startup of the hard disk drive. The current 904 flowing in a status 901 after the start of power feed to the drives and before the spinup is stored in the column 803 of the drive current characteristics table 800 as the sleep current value of the hard disk drive. The current value 905 during the spinup 902 is stored in the column 804 of the drive current characteristics table 800 as the startup current value of the hard disk drive. This startup current includes the circuit current that is consumed during the drive startup in addition to the motor current of the hard disk drive. The current value 906 of the idle status 903 after spinup is stored in the column 805 of the drive current characteristics table 800 as the idle current value of the hard disk drive.

Figure 10:
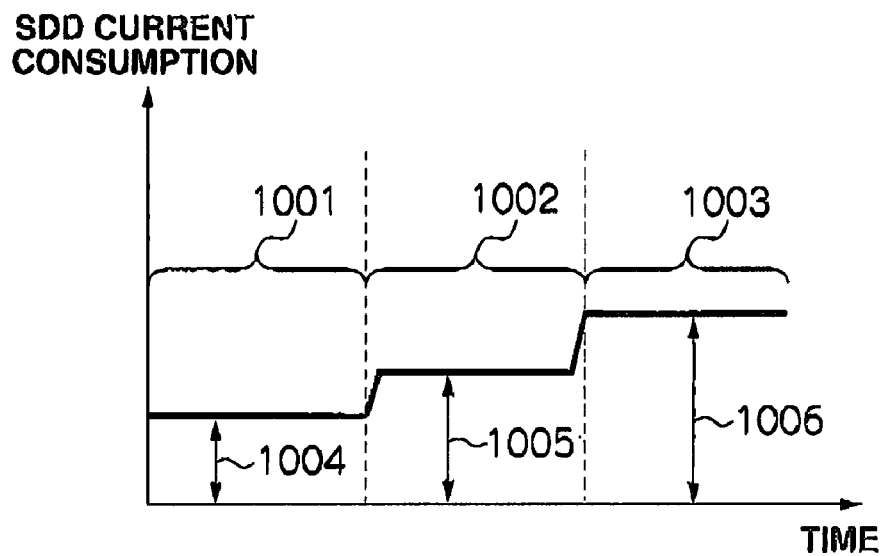
FIG. 10 is a diagram explaining the current consumption characteristics of a solid state drive.

FIG. 10 is a diagram explaining the time change of current consumption from the startup of the solid state drive. The current 1004 flowing to the status 1001 after the start of power feed to the drives and before the interface startup is stored in the column 803 of the drive current characteristics table 800 as the sleep current value of the solid state drive. The idle status current value 1005 after the interface startup 1002 is stored in the column 804 of the drive current characteristics table 800 as the idle current value of the solid state drive. The current value 1006 during the execution 1003 of data read/write to the drive is stored in the column 805 of the drive current characteristics table 800 as the active current value of the solid state drive.

Figure 11:
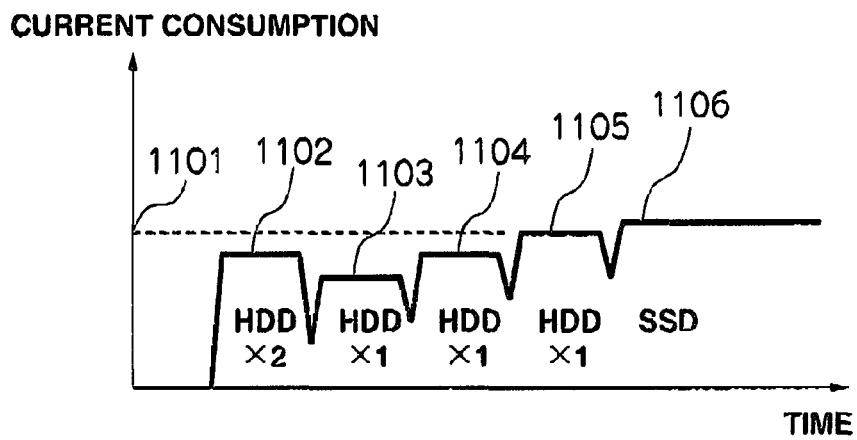
FIG. 11 is a diagram explaining the current saving drive startup policy according to an embodiment of the present invention.

FIG. 11 is a diagram explaining the current saving drive startup policy. This policy controls the drive startup to minimize the current during the startup of drives. Thus, the drive startup is broadly separated into two stages. Foremost, the hard disk drives are started up and, after the startup of all hard disk drives is complete, the solid state drives are started up. Since the current consumption associated with the spinup of hard disk drives will increase, the hard disk drives are started up in several batches (1102 to 1105).

The current value 1101 required for this startup will become smallest if the number of hard disk drives to be started up (1105) last is set to one hard disk drive. A plurality of drives may be simultaneously started up to the extent of not exceeding the current value 1101. For instance, when starting up five hard disks, two hard disk drives are initially started up (1102), and then the remaining hard disk drives are started up one by one (1103 to 1105). Since there is no increase in current associated with the spinup of solid state drives, the solid state drives are collectively started up (1106) so as to shorten the time required for completing the startup of all drives. In addition, since the startup current of the hard disk drives and the current consumption of the solid state drives will not be superimposed, the peak current consumption can be reduced.

Figure 12:
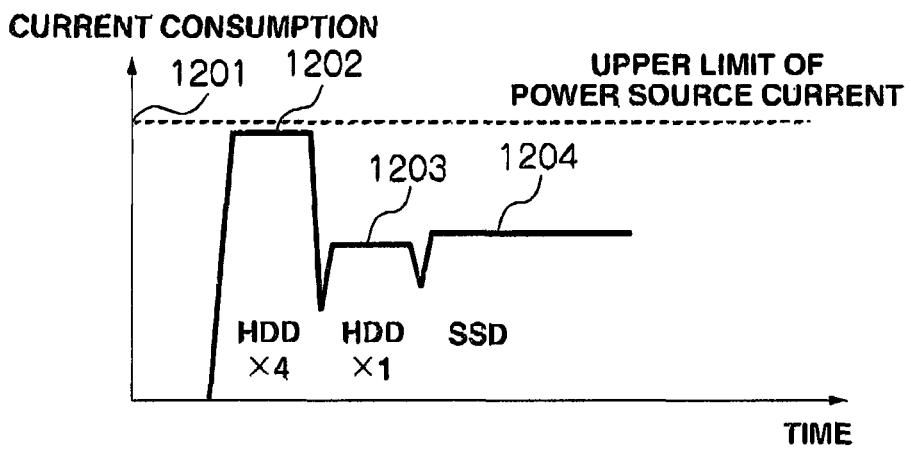
FIG. 12 is a diagram explaining the hard disk drive preferential startup policy according to an embodiment of the present invention.

FIG. 12 is a diagram explaining the hard disk drive preferential startup policy. This policy controls the drive startup so that the startup time of hard disk drives is shortened. The number of hard disk drives that can be simultaneously started up is limited to the upper limit 1201 of the supply current that the power source unit in the enclosure can feed to the drives at the time of startup. Foremost, the hard disk drives that can be started up with current that is less than the supply current upper limit 1201 are simultaneously started up (1202). Subsequently, the hard disk drives that can be started up with the difference of the supply current upper limit 1201 and the started drive current are simultaneously started up (1203). After the startup of all hard disk drives is complete, the solid state drives are collectively started up (1204). According to this drive startup policy, since the number of hard disk drives to be simultaneously started up will become maximum and the solid state drives are collectively started up, the drive startup time can be shortened.

Figure 13:
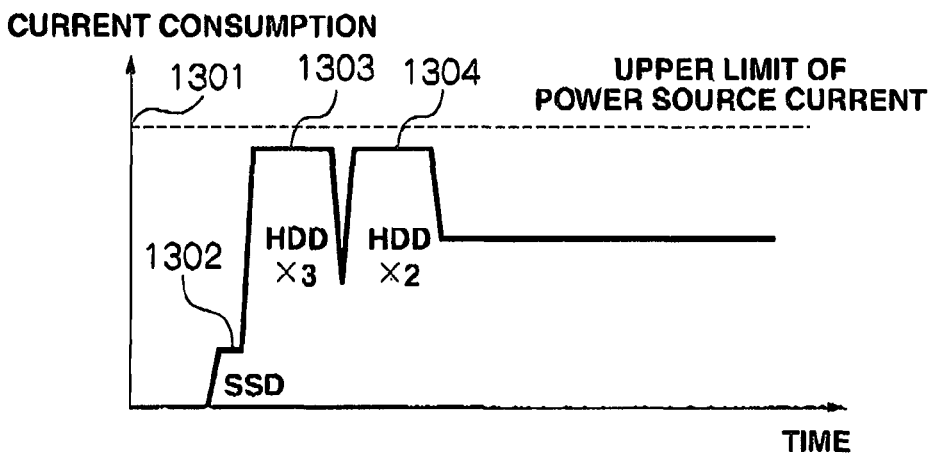
FIG. 13 is a diagram explaining the solid state drive preferential startup policy according to an embodiment of the present invention.

FIG. 13 is a diagram explaining the solid state drive preferential startup policy. This policy controls the drive startup so as to also shorten the startup time of hard disk drives after the startup of solid state drives. Foremost, all solid state drives are started up (1302). Subsequently, the number of hard disk drives that can be simultaneously started up will be limited to the difference between the upper limit 1301 of the supply current that the power source unit in the enclosure can feed to the drives at the time of startup, and the current consumption of the solid state drives and the started up hard disk drives. The hard disk drives that can be started up with current that is less than the foregoing differential value are simultaneously started up (1303). This process is repeated until the startup of all hard disk drives is complete (1304). According to this drive startup policy, it will be possible to access the solid state drives immediately after starting the drive startup processing.

The drive type identification means of the present embodiment is now explained with reference to FIG. 14 to FIG. 17.

Figure 14:
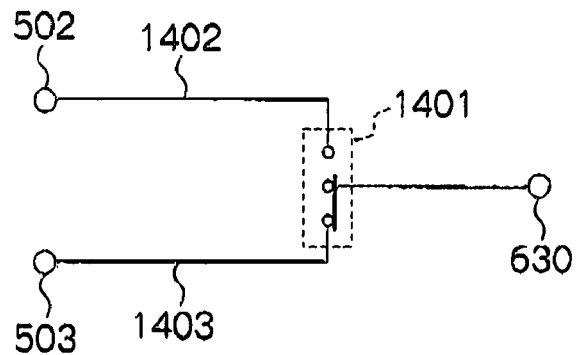
FIG. 14 is a diagram explaining the drive type identification means according to an embodiment of the present invention.

FIG. 14 is a diagram explaining the means for identifying the drive type with a jumper pin provided in the drive cartridge. The jumper pin 1401 and the input pin 502 are connected with a signal line 1402. Positive power supply voltage is input to the input pin 502. The jumper pin 1401 and the input pin 503 are connected with a signal line 1403. Negative power supply voltage is input to the input pin 503. The jumper pin 1401 selects the connection with the signal line 1402 or the signal line 1403, and outputs the selected voltage signal to the drive type detection signal pin 630.

For instance, if the drive built into the drive cartridge is a hard disk drive, the jumper pin 1401 selects the connection of the signal line 1403 and the drive type detection signal pin 630, and in the case of a solid state drive, the jumper pin 1401 selects the connection of the signal line 1402 and the drive type detection signal pin 630. Thereby, it will be possible to identify that the built-in drive is a solid state drive if the output voltage of the drive type detection signal pin 630 is a positive power supply voltage, and identifier that the built-in drive is a hard disk drive if the output voltage is a negative power supply voltage.

The drive startup control unit 652 of FIG. 6 identifies the drive type from the output voltage of the drive type detection signal pin 630, and sends the drive identification result to the storage controller SC via the expander 100 and the network N00, or via the expander 100 and the channel D00. The storage controller SC inputs the received identification result into the drive startup control management table 700.

Figure 15:
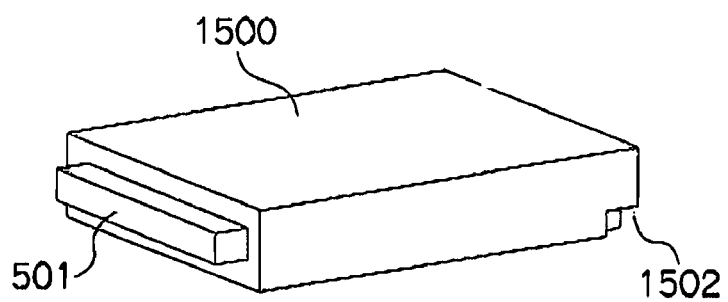
FIG. 15 is a diagram explaining the drive type identification means according to an embodiment of the present invention.
Figure 16:
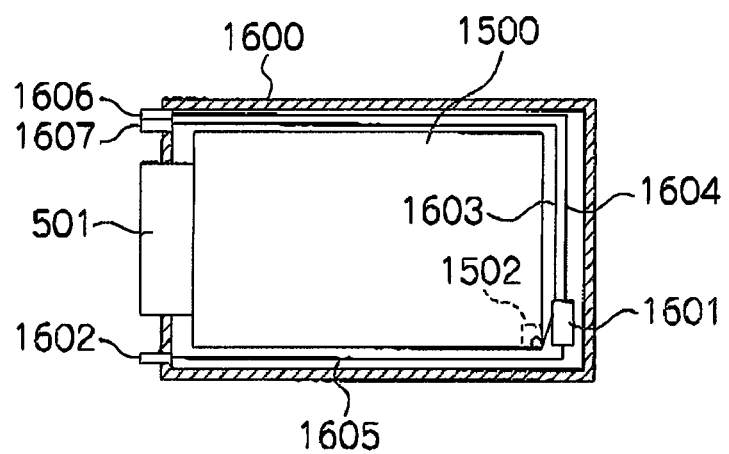
FIG. 16 is a diagram explaining the drive type identification means according to an embodiment of the present invention.

FIG. 15 and FIG. 16 are diagrams explaining the means for identifying the drive type by detecting a difference in the outer shape of the hard disk drive and the solid state drive.

FIG. 15 shows the outer shape of a solid state drive 1500. A concave portion 1502 is formed in the solid state drive 1500. This concave portion 1502 may be formed anywhere on the outer shape of the drive, but is formed at a location where it will not be a concave portion in the hard disk drive.

FIG. 16 is a diagram showing the solid state drive 1500 housed in the drive cartridge 1600. The drive cartridge 1600 comprises a micro switch 1601, a drive type detection signal pin 1602, and input pins 1606, 1607.

Inside the drive cartridge 1600, the micro switch 1601 and the input pin 1607 input with the positive power supply voltage are connected with a signal line 1603. The micro switch 1601 and the input pin 1606 input with the negative power supply voltage are connected with a signal line 1604. The micro switch 1601 is connected to the drive type detection signal pin 1602 via the signal line 1605. If the micro switch 1601 is not pressed, positive power supply voltage is output to the drive type detection signal pin 1602. If the micro switch 1601 is pressed, negative power supply voltage is output to the drive type detection signal pin 1602.

If the drive cartridge 1600 has a built-in solid state drive 1500 provided with the concave portion 1502, the status will be such that the micro switch 1601 is not pressed, and positive power supply voltage is output to the drive type detection signal pin 1602. Meanwhile, if the drive cartridge 1600 has a built-in hard disk drive without a concave portion, the status will be such that the micro switch 1601 is pressed, and negative power supply voltage is output to the drive type detection signal pin 1602. Accordingly, it will be possible to identify the drive type by checking the output voltage of the drive type detection signal pin 1602.

Figure 17:
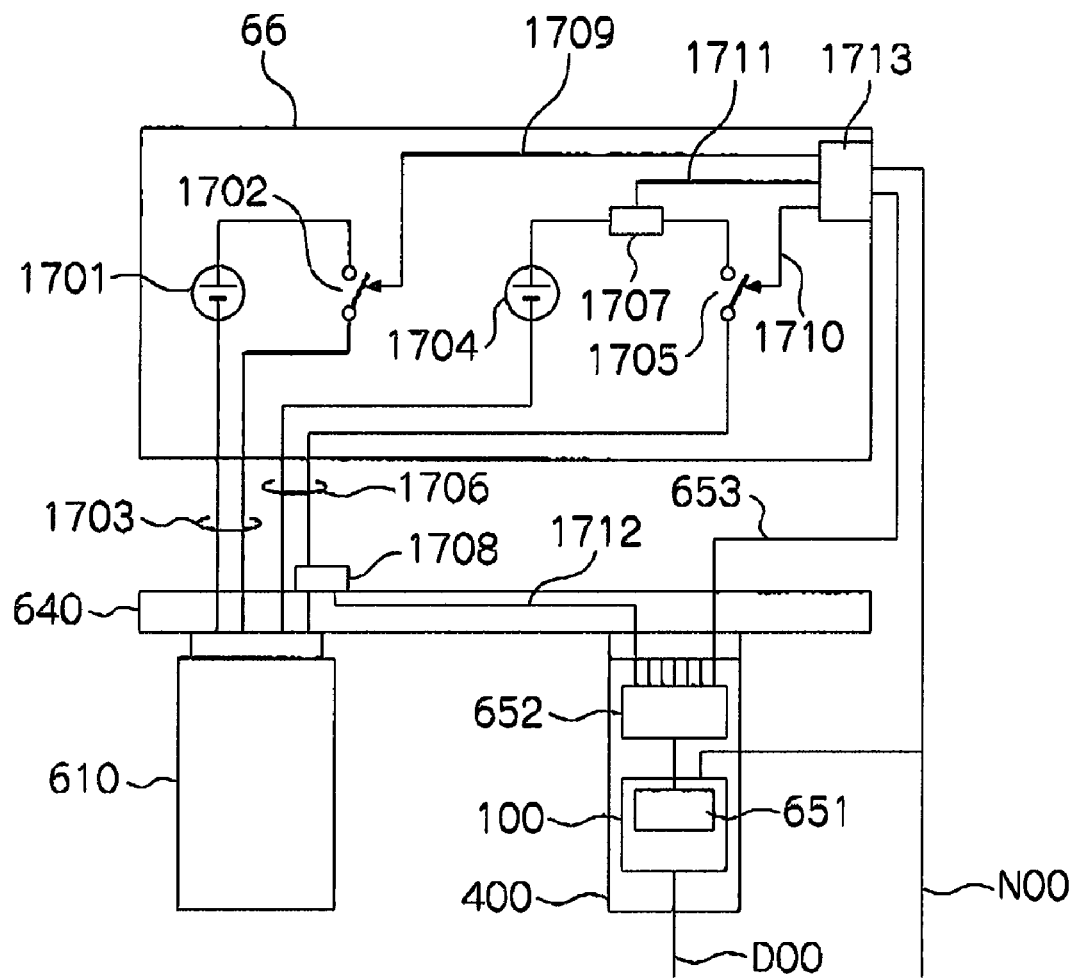
FIG. 17 is a diagram explaining the drive type identification means according to an embodiment of the present invention.

FIG. 17 is a diagram explaining the drive type identification means based on drive current measurement. According to this means, the drive type can be identified without having to provide a drive type detection signal pin to the drive cartridge as described above. In FIG. 17, the power source unit 66 comprises a plurality of voltage sources 1701 and 1704.

The voltage source 1701 is, for example, a 5V power source, and is a power source for supplying power to the electrical circuit unit of the hard disk drive and to the solid state drive. The voltage source 1704 is, for example, a 12V power source, and is a power source for supplying power to the motor of the hard disk drive. The voltage source 1701 supplies power to the drive built into the drive cartridge 610 via the switch 1702 and the power source wire 1703. The voltage source 1704 supplies power to the drive built into the drive cartridge 610 via the switch 1705, the current sensors 1707, 1708 and the power source wire 1706. The power control unit 1713 is connected to the maintenance terminal SVP and the expander 100 via the network N00. The power control unit 1713 is connected to the drive startup control unit 652 via the power control signal line 653.

In the power source unit 66, the power control unit 1713 and the switch 1702 are connected via the switch control signal line 1709, and the power control unit 1713 and the switch 1705 are connected via the switch control signal line 1710, respectively. The output of the current sensor 1707 is connected with the power control unit 1713 via the current sensor output signal line 1711. The output of the current sensor 1708 is connected to the drive startup control unit 652 via the current sensor output signal line 1712 on the backplane 640. The storage controller SC sends the switch command of the switches 1702, 1705 to the power control unit 1713 via the power control signal line 653 or the network N00.

The switches 1702, 1705 receive a command from the storage controller SC via the power control unit 1713 and the switch control signal lines 1709, 1710, and thereby switch the ON/OFF. When the switch 1705 is turned ON, although the supply current will not flow if the drive built into the drive cartridge 610 is a solid state drive, a certain degree of current will flow in the case of a hard disk drive even if it is before the spinup.

For example, when referring to the column 803 of FIG. 8 the 12V supply current of the hard disk drive is 20 mA before the spinup. Since the 12V supply current of the solid state drive is 0 mA, the drive type can be identified by detecting the current difference with the current sensor 1707 or 1708. The drive startup control unit 652 identifies the drive type based on the output from the current sensor 1708, and sends the drive identification result to the storage controller SC via the expander 100 and the network N00, or via the expander 100 and the channel D00. The storage controller SC inputs the received identification result into the drive startup control management table 700. Both current sensors 1707 and 1708 are not necessarily required, and it would suffice so as long as one of the current sensors detects the drive supply current and inputs the identification result into the drive startup control management table 700.

FIG. 18 to FIG. 23 are flowcharts explaining an example of the drive startup control for each of the three types of drive startup policies. The storage controller SC controls the drive startup in units of drive groups that receive the power delivery from a common power source unit. In this embodiment, the storage controller SC controls the drive startup in enclosure units. The drive startup routine explained here yields a significant effect in reducing the current peak since the ON/OFF of power supply is performed to each drive.

Figure 18:
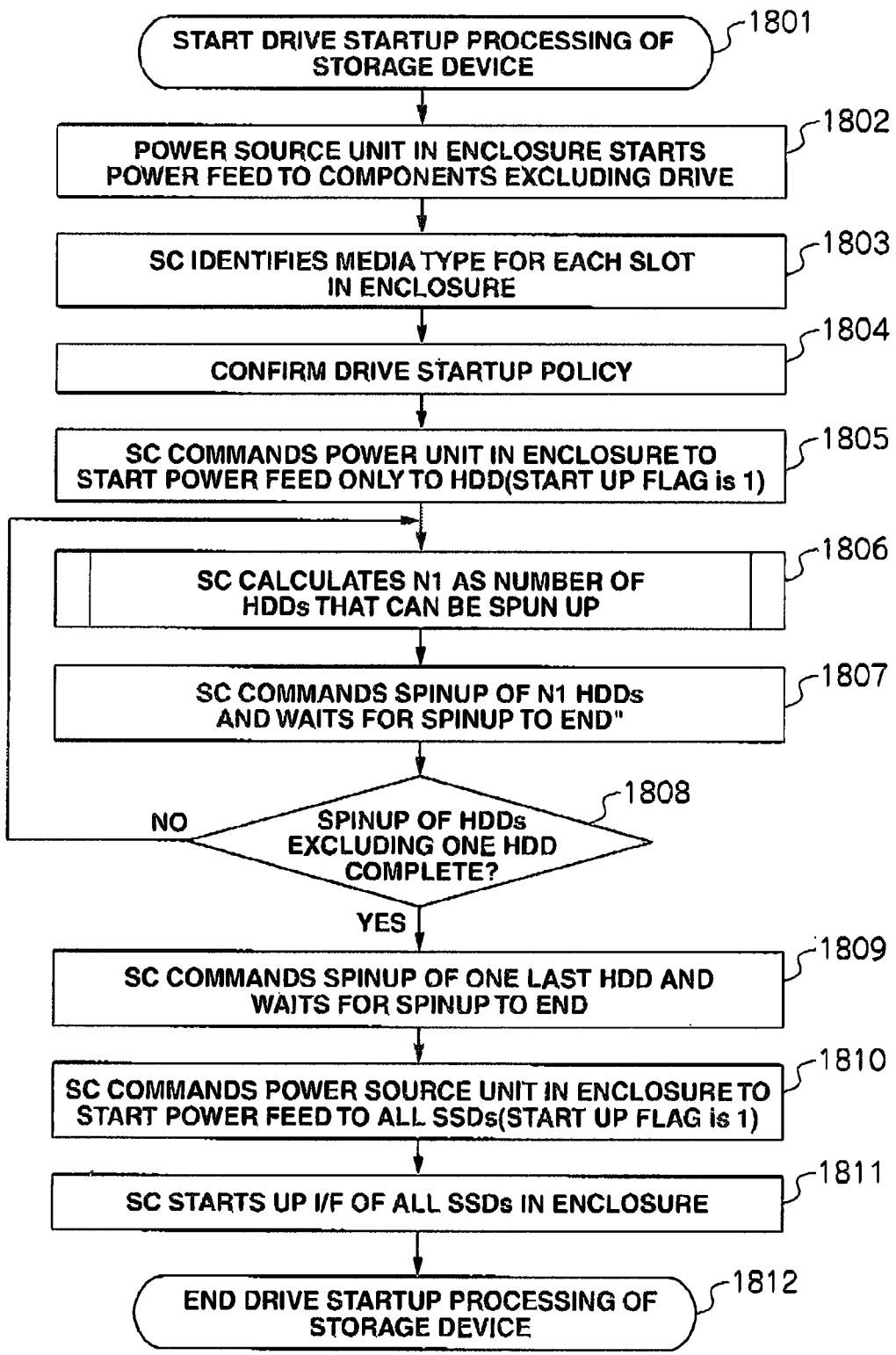
FIG. 18 is a flowchart explaining the drive startup method according to an embodiment of the present invention.
Figure 19:
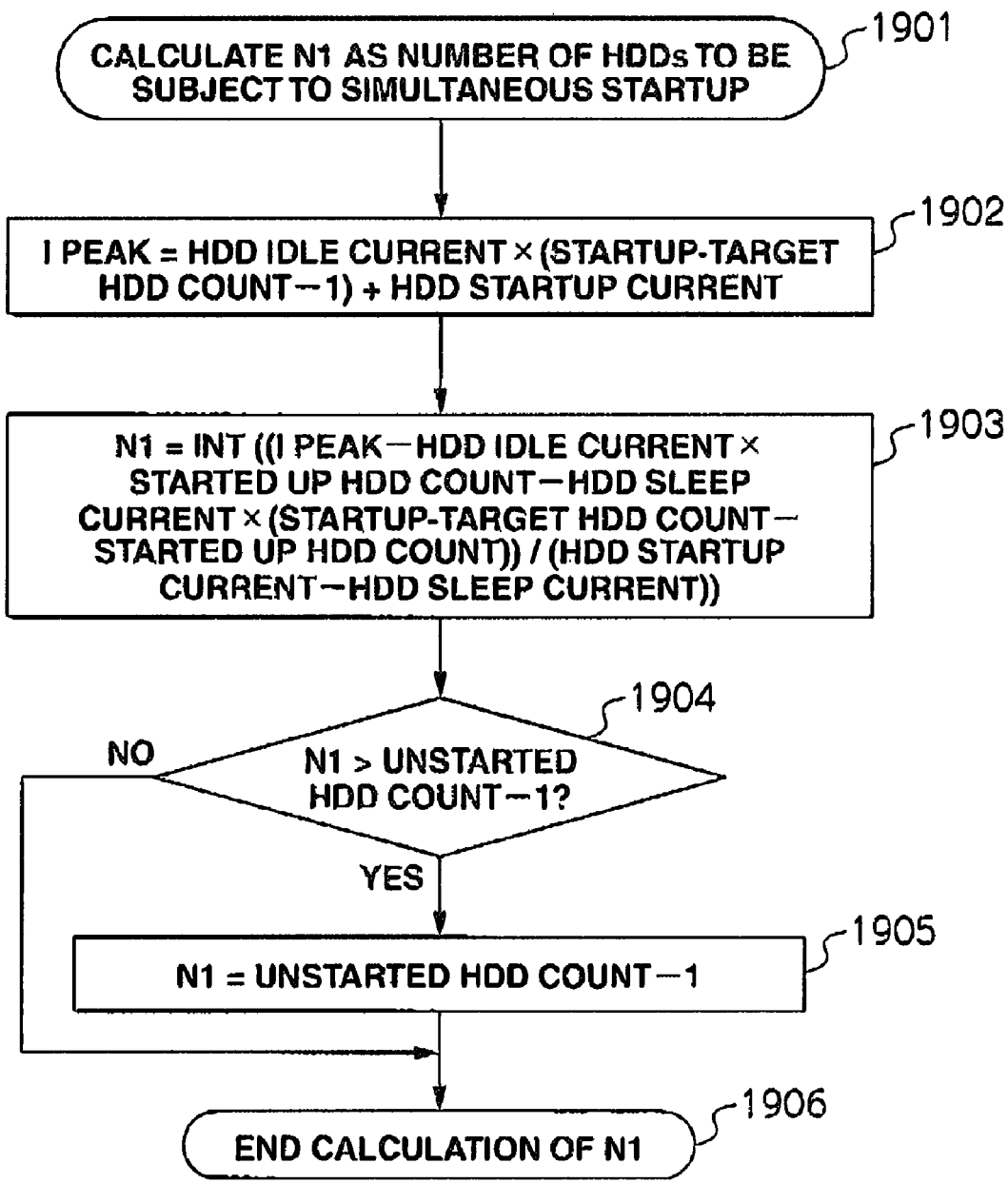
FIG. 19 is a flowchart explaining the method of determining the simultaneous startup HDD count according to an embodiment of the present invention.

FIG. 18 and FIG. 19 are flowcharts explaining the drive startup routine of the current saving drive startup policy.

At step 1801, the drive startup processing of the storage device is started. At step 1802, the power source unit in the enclosure starts supplying power to components excluding the drive.

At step 1803, the drive startup control unit observes the voltage of the drive type detection signal pin of each drive cartridge, and identifies the type of drive built into the respective drive cartridges. The storage controller SC thereafter receives the drive type identification result of the drive startup control unit, and updates the drive startup control management table 700. Otherwise, the storage device administrator may also designate the drive type by inputting data of the drive startup control management table 700 from the maintenance terminal SVP.

At step 1804, the storage controller SC confirms the drive startup policy, and the step 1805, the storage controller SC refers to the drive startup control management table 700, and commands the power source unit to start the power delivery to a startup-target drive in which the drive type is a hard disk drive and the startup flag is 1. This command to the power source unit may be sent either via the drive startup control unit on the expander board or via the network N00. The hard disk drive will not be spun up merely by starting the power delivery. For instance, with a SATA hard disk drive with a enabled Staggered Spin-up function, the spinup processing is started by being triggered with the startup of the SATA interface (to enter the Phy Ready status).

At step 1806, the storage controller SC calculates the simultaneous startup hard disk drive count n1. This will be explained in detail later. At step 1807, the storage controller SC commands the start of spinup processing to n1 hard disk drives, and waits for the spinup to end.

At step 1808, the storage controller SC determines whether the spinup processing of hard disk drives having a startup flag of 1 excluding one hard disk drive is complete. The storage controller SC returns to step 1806 if the result is NO and proceeds to step 1809 if the result is YES. At step 1809, the storage controller SC commands the start of spinup processing of the one last hard disk drive, and waits for the spinup to end.

At step 1810, the storage controller SC refers to the drive startup control management table 700, and commands the power source unit to start the power delivery to a startup-target drive in which the drive type is a solid state drive and the startup flag is 1.

At step 1811, the storage controller SC starts up the interface (enters the Phy Ready status) of the solid state drive to which the power delivery was started. The drive startup processing of the storage device is thereby complete (step 1812).

FIG. 19 is a flowchart explaining the routine of calculating the simultaneous startup hard disk drive count n1. At step 1806 of FIG. 18, the subroutine of step 1901 to step 1906 is called.

At step 1902, the minimum requisite current value I peak upon starting up the hard disk drive is calculated according to the following formula.

$$I\text{ peak} = \text{HDD Idle current} \times (\text{startup-target HDD count} - 1) + \text{HDD Startup current}$$

The HDD Idle current is the idle current value of the hard disk drive, and the HDD Startup current is the startup current value of the hard disk drive.

At step 1903, n1 as the number of hard disk drives that can be simultaneous started up is calculated according to the following formula.

$$n1 = \text{int}((I\text{ peak} - \text{HDD Idle current} \times \text{started up HDD count} - \text{HDD Sleep current} \times (\text{startup-target HDD count} - \text{started up HDD count})) / (\text{HDD Startup current} - \text{HDD Sleep current}))$$

At step 1904, whether the simultaneous startup hard disk drive count n1 is greater than the unstarted hard disk drive count−1 is determined. Here, the unstarted hard disk drive count includes only the startup-target drives in which the startup flag 704 of the drive startup control management table 700 is 1. The routine proceeds to step 1905 if the result is YES and proceeds to step 1906 if the result is NO.

At step 1905, the unstarted hard disk drive count−1 is substituted for the simultaneous startup hard disk drive count n1. The calculation processing of the simultaneous startup hard disk drive count n1 is thereby complete (step 1906). If a plurality of power supply voltages are to be supplied to the drives, the simultaneous startup hard disk drive count is calculated for each power supply voltage, and the minimum value among such number of hard disk drives is selected as the simultaneous startup hard disk drive count.

Figure 20:
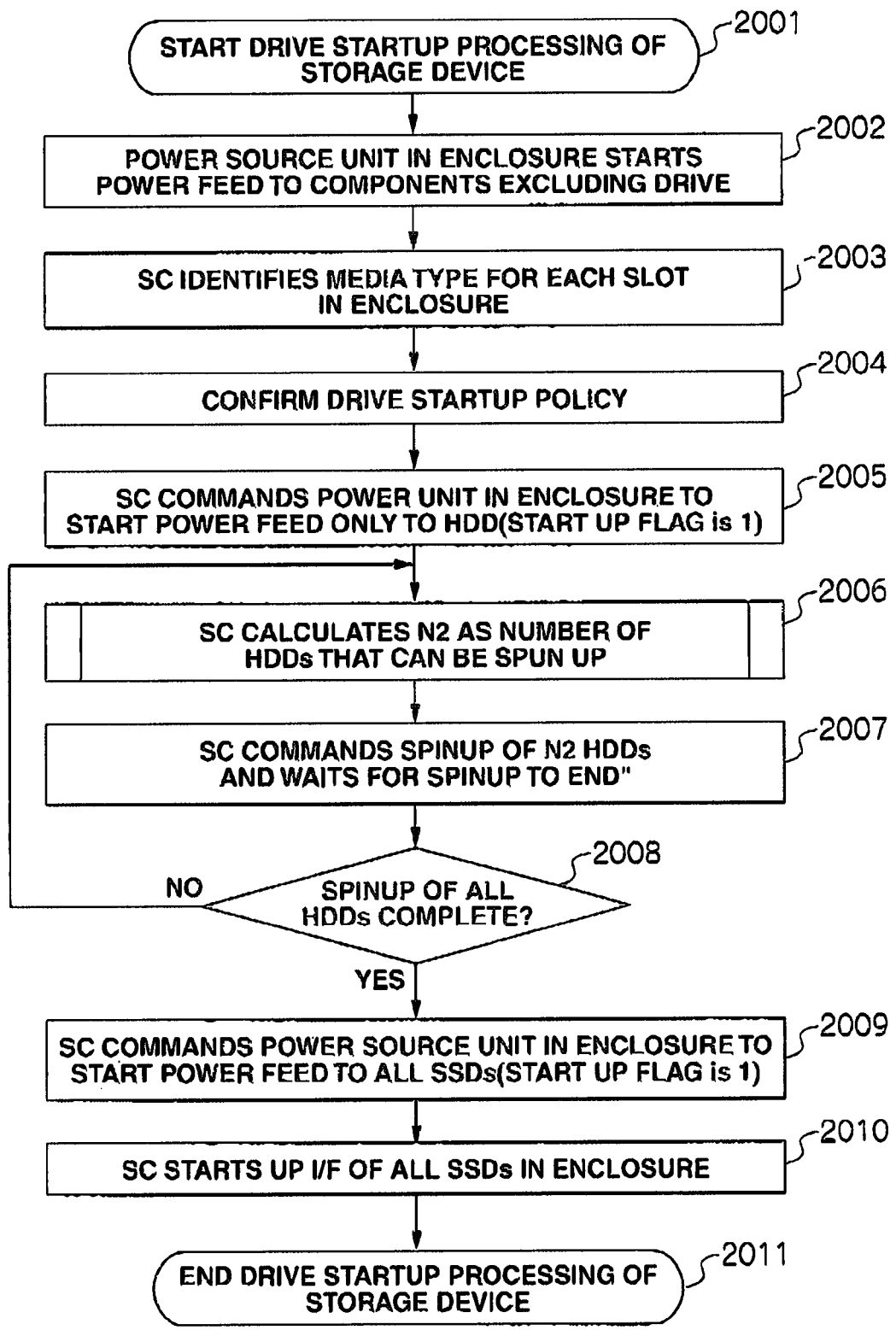
FIG. 20 is a flowchart explaining the drive startup method according to an embodiment of the present invention.
Figure 21:
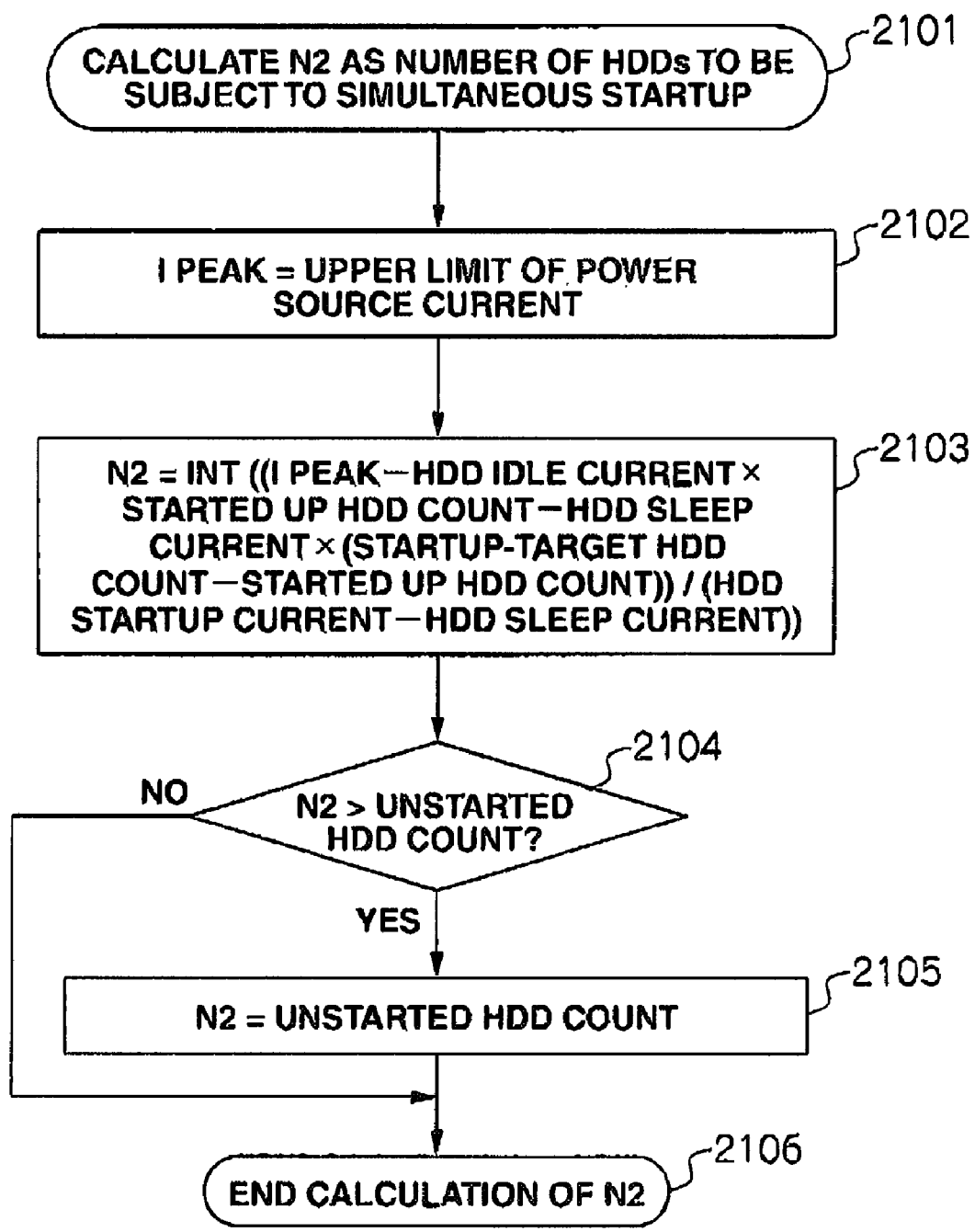
FIG. 21 is a flowchart explaining the method of determining the simultaneous startup HDD count according to an embodiment of the present invention.

FIG. 20 and FIG. 21 are flowcharts explaining the drive startup routine of the hard disk drive preferential startup policy. Step 2001 to step 2005 are the same as steps 1801 to 1805 of FIG. 18, and the detailed explanation thereof is omitted.

At step 2006, the storage controller SC calculates the simultaneous startup hard disk drive count n2. This will be described in detail later. At step 2007, the storage controller SC commands the start of spinup processing to n2 hard disk drives, and waits for the spinup to end.

At step 2008, the storage controller SC determines whether the spinup processing of all hard disk drives having a startup flag of 1 is complete. The storage controller SC returns to step 2006 if the result is NO and proceeds to step 2009 if the result is YES.

At step 2009, the storage controller SC refers to the drive startup control management table 700, and commands the power source unit to start the power delivery to a startup-target drive in which the drive type is a solid state drive and the startup flag is 1.

At step 2010, the storage controller SC starts up the interface (enters the Phy Ready status) of the solid state drive to which the power delivery was started. The drive startup processing of the storage device is thereby complete (step 2011).

FIG. 21 is a flowchart explaining the routine for calculating the simultaneous startup hard disk drive count n2. At step 2006 of FIG. 20, the subroutine of step 2101 to step 2106 is called.

At step 2102, the maximum current value that can be supplied by the power source unit upon starting up the hard disk drives is substituted for I peak.

At step 2103, n2 as the number of hard disk drives that can be simultaneously started up is calculated according to the following formula.

$$n2 = \text{int}((I\text{ peak}-\text{HDD Idle current}\times\text{started up HDD count}-\text{HDD Sleep current}\times(\text{startup-target HDD count}-\text{started up HDD count}))/(\text{HDD Startup current}-\text{HDD Sleep current}))$$

At step 2104, whether the simultaneous startup hard disk drive count n2 is greater than the unstarted hard disk drive count is determined. Here, the unstarted hard disk drive count includes only the startup-target drives in which the startup flag 704 of the drive startup control management table 700 is 1. The routine proceeds to step 2105 if the result is YES and proceeds to step 2106 if the result is NO.

At step 2105, the unstarted hard disk drive count is substituted for the simultaneous startup hard disk drive count n2. The calculation processing of the simultaneous startup hard disk drive count n2 is thereby complete (step 2106).

If a plurality of power supply voltages are to be supplied to the drives, the simultaneous startup hard disk drive count is calculated for each power supply voltage, and the minimum value among such number of hard disk drives is selected as the simultaneous startup hard disk drive count.

Figure 22:
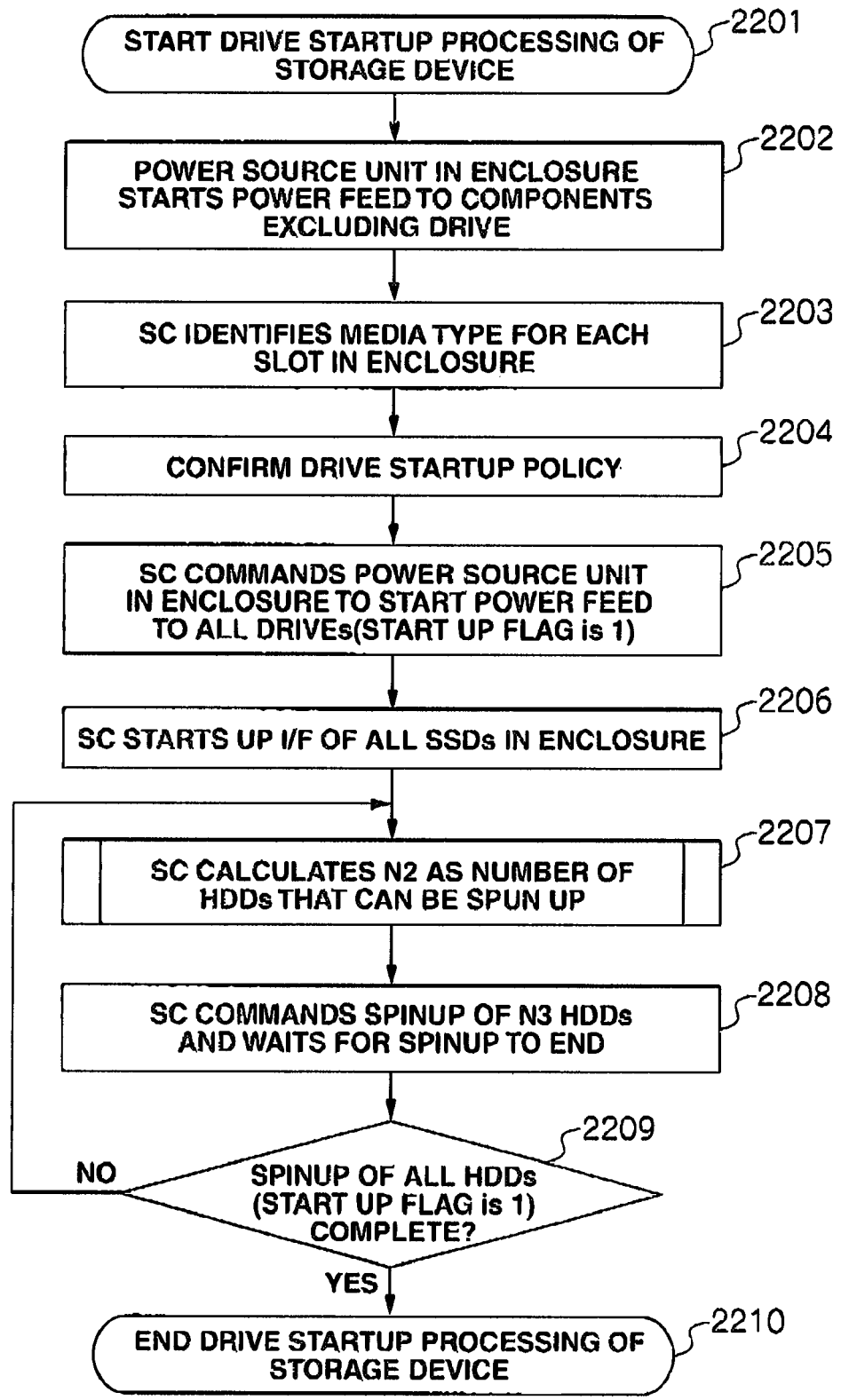
FIG. 22 is a flowchart explaining the drive startup method according to an embodiment of the present invention.
Figure 23:
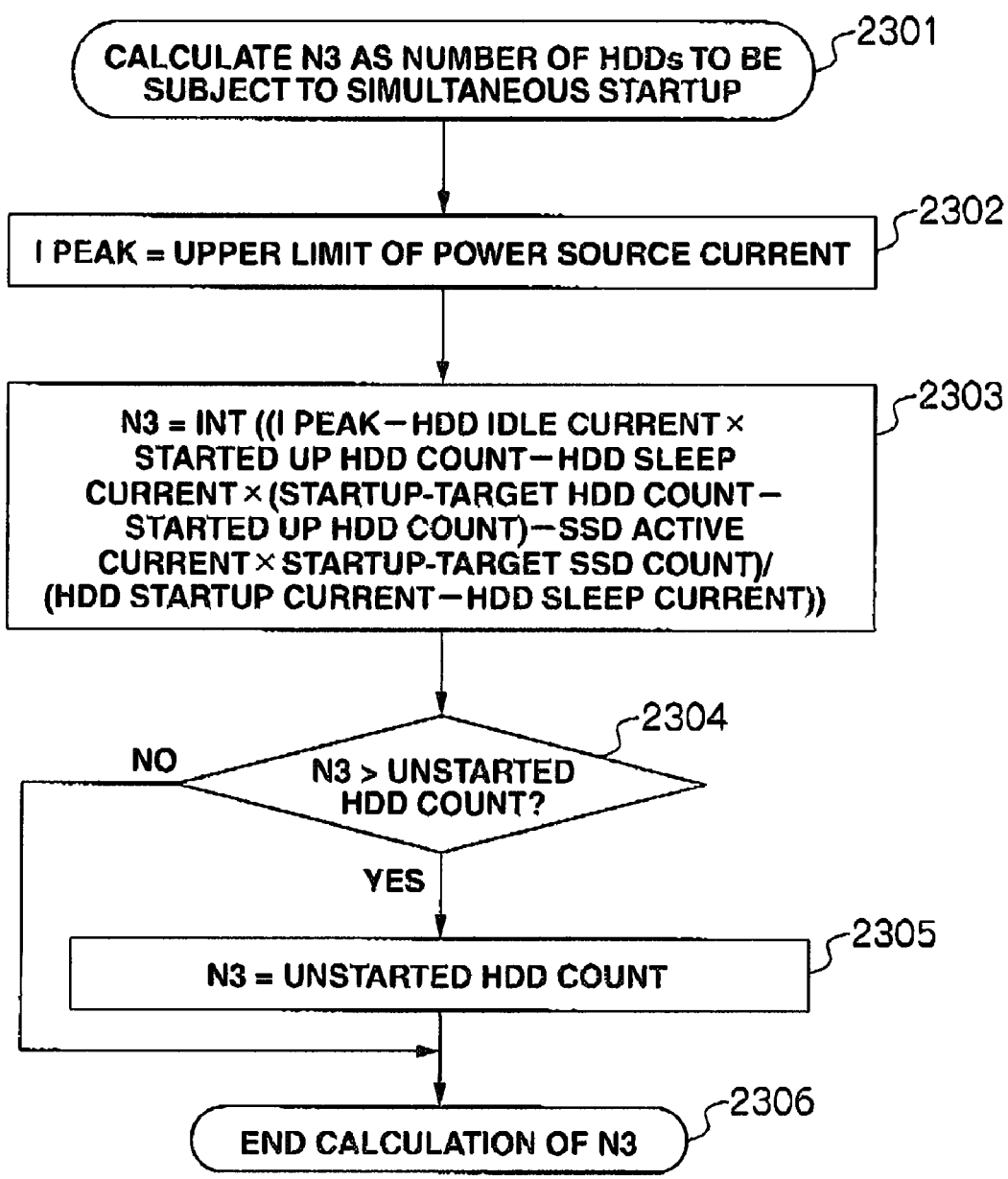
FIG. 23 is a flowchart explaining the method of determining the simultaneous startup HDD count according to an embodiment of the present invention.

FIG. 22 and FIG. 23 are flowcharts explaining the drive startup routine of the solid state drive preferential startup policy. Step 2201 to step 2204 are the same as steps 1801 to 1804 of FIG. 18, and the detailed explanation thereof is omitted.

At step 2205, the storage controller SC refers to the drive startup control management table 700, and commands the power source unit to start the power delivery to a startup-target drive in which the startup flag is 1.

At step 2206, the storage controller SC starts up the interface (enters the Phy Ready status) of the solid state drive to which the power delivery was started.

At step 2207, the storage controller SC calculates the simultaneous startup hard disk drive count n3. This will be described in detail later.

At step 2208, the storage controller SC commands the start of spinup processing of n3 hard disk drives, and waits for the spinup to end.

At step 2209, the storage controller SC determines whether the spinup processing of all hard disk drives having a startup flag of 1 is complete. The storage controller SC returns to step 2207 if the result is NO and proceeds to step 2210 if the result is YES. The drive startup processing of the storage device is thereby complete (step 2210).

FIG. 23 is a flowchart explaining the routine for calculating the simultaneous startup hard disk drive count n3. At step 2207 of FIG. 22, the subroutine of step 2301 to step 2306 is called.

At step 2302, the maximum current value that can be supplied by the power source unit upon starting up the hard disk drives is substituted for I peak.

At step 2303, n3 as the number of hard disk drives that can be simultaneously started up is calculated according to the following formula.

$$n3 = \text{int}((I\text{ peak}-\text{HDD Idle current}\times\text{started up HDD count}-\text{HDD Sleep current}\times(\text{startup-target HDD count}-\text{started up HDD count})-\text{SSD Active current}\times\text{startup-target SSD count})/(\text{HDD Startup current}-\text{HDD Sleep current}))$$

Here, as the current consumption of the solid state drive, the current value during data access is used in anticipation of the storage controller SC starting its access to the solid state drive.

At step 2304, whether the simultaneous startup hard disk drive count n3 is greater than the unstarted hard disk drive count is determined. Here, the unstarted hard disk drive count includes only the startup-target drives in which the startup flag 704 of the drive startup control management table 700 is 1. The routine proceeds to step 2305 if the result is YES and proceeds to step 2306 if the result is NO.

At step 2305, the unstarted hard disk drive count is substituted for the simultaneous startup hard disk drive count n3. The calculation processing of the simultaneous startup hard disk drive count n3 is thereby complete (step 2306).

If a plurality of power supply voltages are to be supplied to the drives, the simultaneous startup hard disk drive count is calculated for each power supply voltage, and the minimum value among such number of hard disk drives is selected as the simultaneous startup hard disk drive count.

FIG. 24 to FIG. 29 are flowcharts explaining other examples of the drive startup control for each of the three types of drive startup policies. The storage controller SC controls the drive startup in units of drive groups that receive the power delivery from a common power source unit. In this embodiment, the storage controller SC controls the drive startup in enclosure units. When compared with the startup routine of FIG. 18 to FIG. 23, the startup routine explained with reference to FIG. 24 to FIG. 29 does not perform power source switch control for each drive. Thus, this is applicable if no switch is provided for supplying power for each drive in the enclosure, or if the enclosure has a common power source for all drives.

Figure 24:
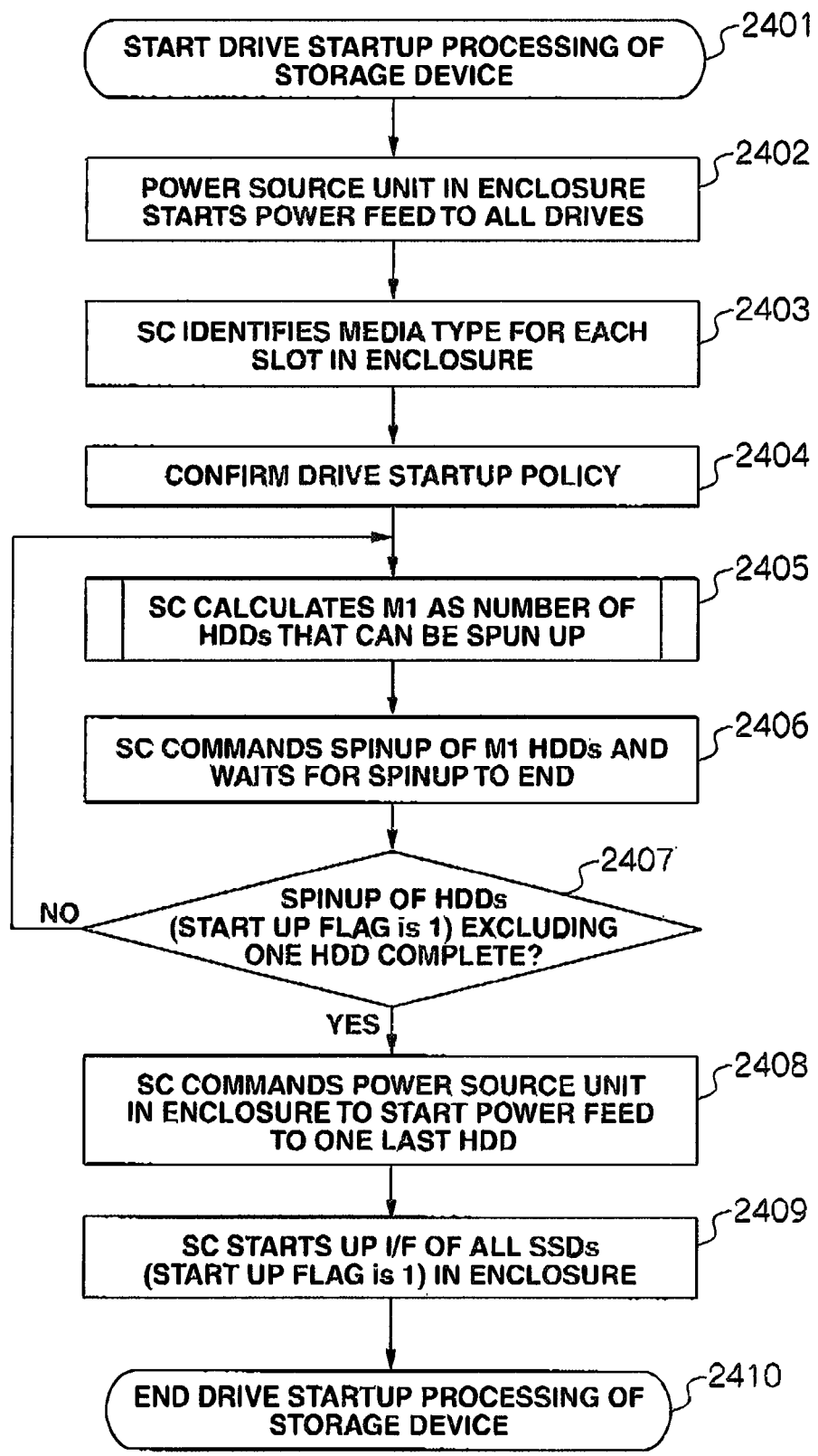
FIG. 24 is a flowchart explaining the drive startup method according to an embodiment of the present invention.
Figure 25:
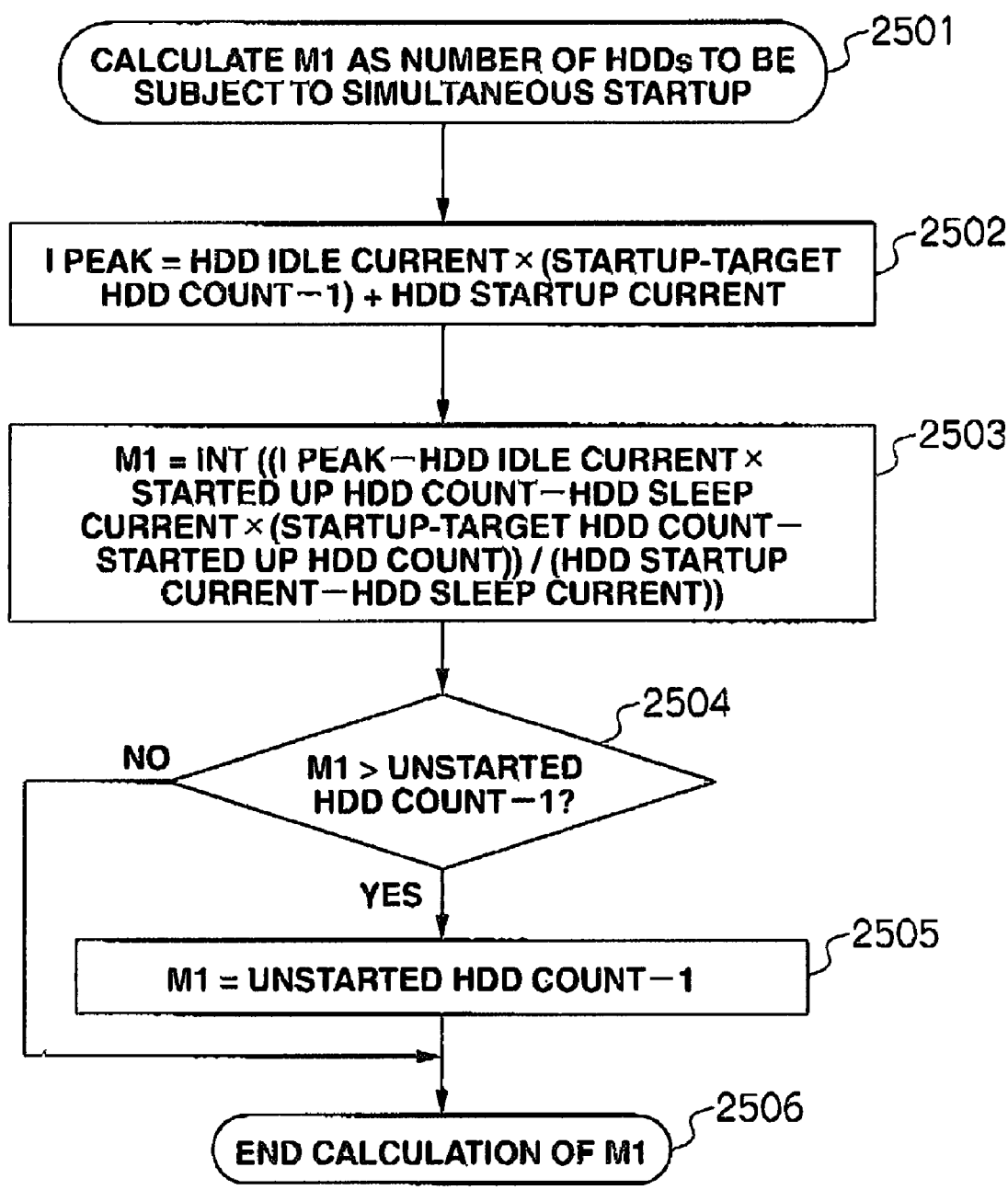
FIG. 25 is a flowchart explaining the method of determining the simultaneous startup HDD count according to an embodiment of the present invention.

FIG. 24 and FIG. 25 are flowcharts explaining the drive startup routine of the current saving drive startup policy.

At step 2401, the drive startup processing of the storage device is started. At step 2402, the power source unit in the enclosure starts supplying power to all drives in the enclosure.

At step 2403, the drive startup control unit observes the voltage of the drive type detection signal pin of each drive cartridge, and identifies the type of drive built into the respective drive cartridges. The storage controller SC thereafter receives the drive type identification result of the drive startup control unit, and updates the drive startup control management table 700. Otherwise, the storage device administrator may also designate the drive type by inputting data of the drive startup control management table 700 from the maintenance terminal SVP.

At step 2404, the storage controller SC confirms the drive startup policy. At step S2405, the storage controller SC calculates the simultaneous startup hard disk drive count m1. This will be explained in detailed later.

At step 2406, the storage controller SC commands the start of spinup processing to m1 hard disk drives, and waits for the spinup to end.

At step 2407, the storage controller SC determines whether the spinup processing of hard disk drives having a startup flag of 1 excluding one hard disk drive is complete. The storage controller SC returns to step 2405 if the result is NO and proceeds to step 2408 if the result is YES.

At step 2408, the storage controller SC commands the start of spinup processing of the one last hard disk drive, and waits for the spinup to end.

At step 2409, the storage controller SC refers to the drive startup control management table 700, and starts up the interface (enters the Phy Ready status) of the solid state drive in which the drive type is a solid state drive and the startup flag is 1. The drive startup processing of the storage device is thereby complete (step 2410).

FIG. 25 is a flowchart explaining the routine for calculating the simultaneous startup hard disk drive count m1. At step 2405 of FIG. 24, the subroutine of step 2501 to step 2506 is called.

At step 2502, the minimum requisite current value I peak upon starting up the hard disk drive is calculated according to the following formula.

$$I\text{peak}=\text{HDD Idle current}\times(\text{startup-target HDD count}-1)+\text{HDD Startup current}$$

At step 2503, m1 as the number of hard disk drives that can be simultaneous started up is calculated according to the following formula.

$$m1=\text{int}((I\text{peak}-\text{HDD Idle current}\times\text{started up HDD count}-\text{HDD Sleep current}\times(\text{startup-target HDD count}-\text{started up HDD count}))/(\text{HDD Startup current}-\text{HDD Sleep current}))$$

At step 2504, whether the simultaneous startup hard disk drive count m1 is greater than the unstarted hard disk drive count−1 is determined. Here, the unstarted hard disk drive count includes only the startup-target drives in which the startup flag 704 of the drive startup control management table 700 is 1. The routine proceeds to step 2505 if the result is YES and proceeds to step 2506 if the result is NO.

At step 2505, the unstarted hard disk drive count−1 is substituted for the simultaneous startup hard disk drive count m1.

The calculation processing of the simultaneous startup hard disk drive count m1 is thereby complete (step 2506). If a plurality of power supply voltages are to be supplied to the drives, the simultaneous startup hard disk drive count is calculated for each power supply voltage, and the minimum value among such number of hard disk drives is selected as the simultaneous startup hard disk drive count.

Figure 26:
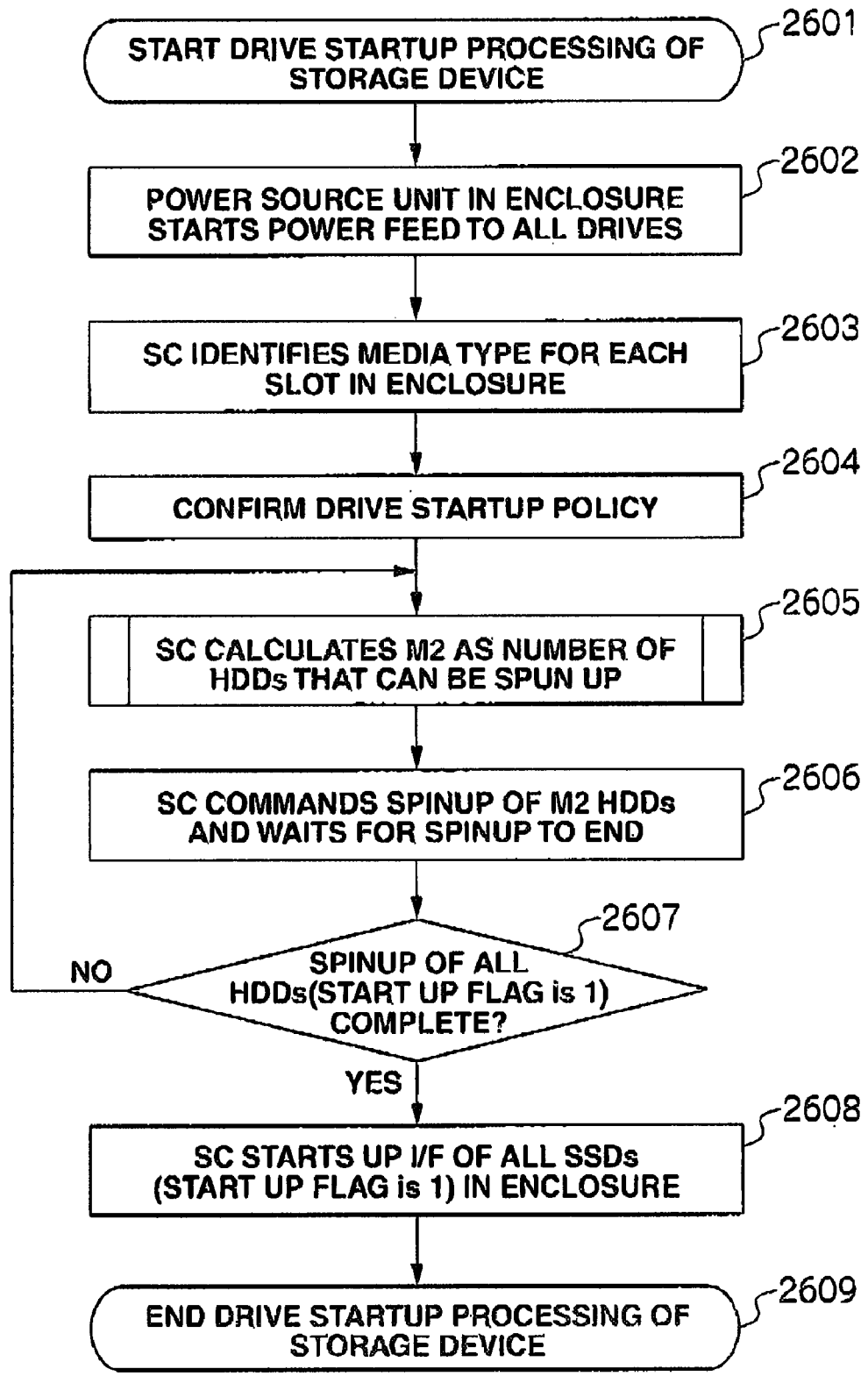
FIG. 26 is a flowchart explaining the drive startup method according to an embodiment of the present invention.
Figure 27:
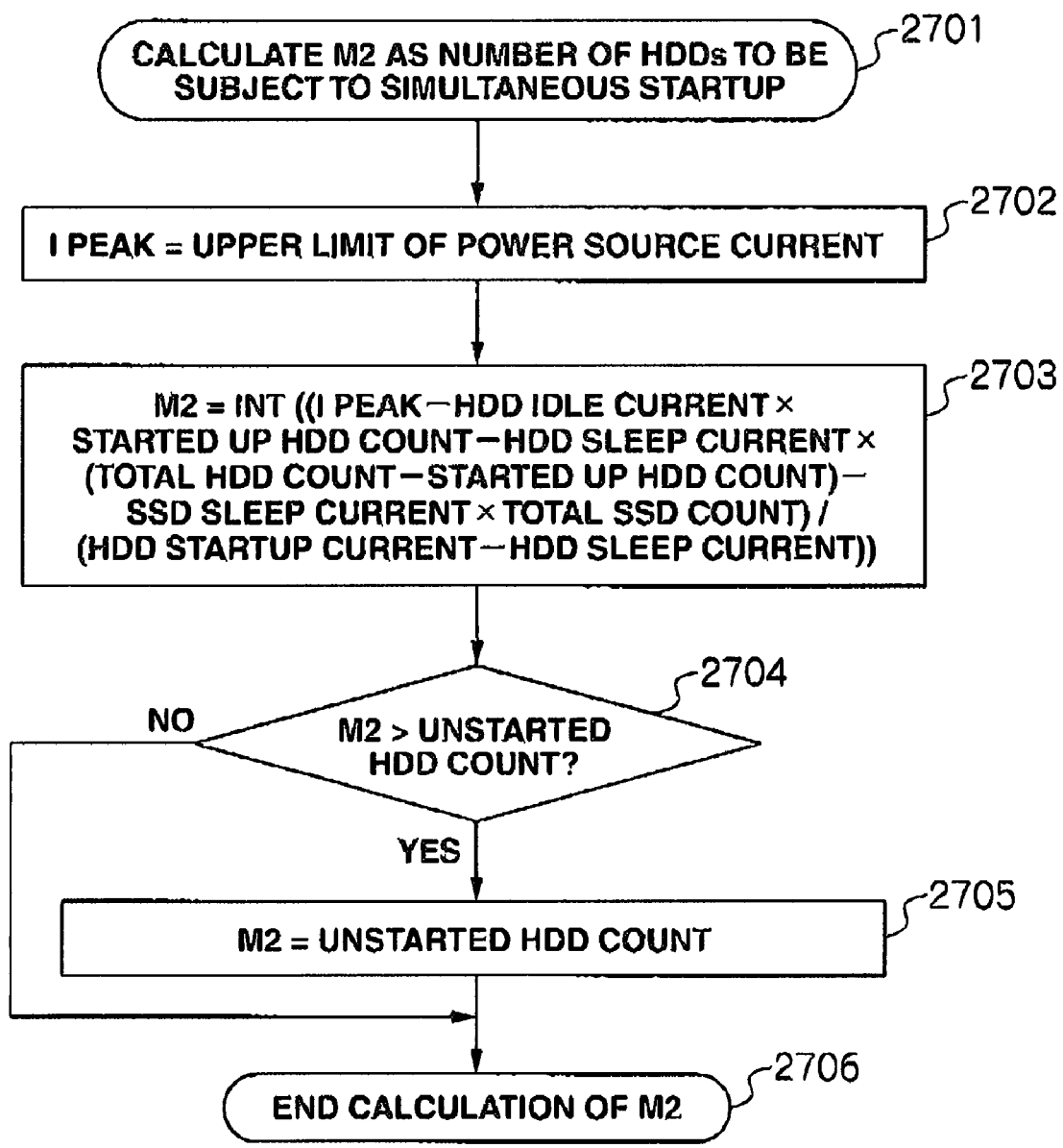
FIG. 27 is a flowchart explaining the method of determining the simultaneous startup HDD count according to an embodiment of the present invention.

FIG. 26 and FIG. 27 are flowcharts explaining the drive startup routine of the hard disk drive preferential startup policy. Step 2601 to step 2604 are the same as steps 2401 to 2404 of FIG. 24, and the detailed explanation thereof is omitted.

At step 2605, the storage controller SC calculates the simultaneous startup hard disk drive count m2. This will be explained in detail later.

At step 2606, the storage controller SC commands the start of spinup processing to m2 hard disk drives, and waits for the spinup to end.

At step 2607, the storage controller SC determines whether the spinup processing of all hard disk drives having a startup flag of 1 is complete. The storage controller SC returns to step 2605 if the result is NO and proceeds to step 2608 if the result is YES.

At step 2608, the storage controller SC refers to the drive startup control management table 700, and starts up the interface (enters the Phy Ready status) of solid state drives in which the drive type is a solid state drive and the startup flag is 1. The drive startup processing of the storage device is thereby complete (step 2609).

FIG. 27 is a flowchart explaining the routine for calculating the simultaneous startup hard disk drive count m2. At step 2605 of FIG. 26, the subroutine of step 2701 to step 2706 is called.

At step 2702, the maximum current value that can be supplied by the power source unit upon starting up the hard disk drives is substituted for I peak.

At step 2703, m2 as the number of hard disk drives that can be simultaneous started up is calculated according to the following formula.

$$m2=\text{int}((I\text{peak}-\text{HDD Idle current}\times\text{started up HDD count}-\text{HDD Sleep current}\times(\text{total HDD count}-\text{started up HDD count})-\text{SSD Sleep current}\times\text{total SSD count})/(\text{HDD Startup current}-\text{HDD Sleep current}))$$

At step 2704, whether the simultaneous startup hard disk drive count m2 is greater than the unstarted hard disk drive count is determined. Here, the unstarted hard disk drive count includes only the startup-target drives in which the startup flag 704 of the drive startup control management table 700 is 1. The routine proceeds to step 2705 if the result is YES and proceeds to step 2706 if the result is NO.

At step 2705, the unstarted hard disk drive count is substituted for the simultaneous startup hard disk drive count m2.

The calculation processing of the simultaneous startup hard disk drive count m2 is thereby complete (step 2706). If a plurality of power supply voltages are to be supplied to the drives, the simultaneous startup hard disk drive count is calculated for each power supply voltage, and the minimum value among such number of hard disk drives is selected as the simultaneous startup hard disk drive count.

Figure 28:
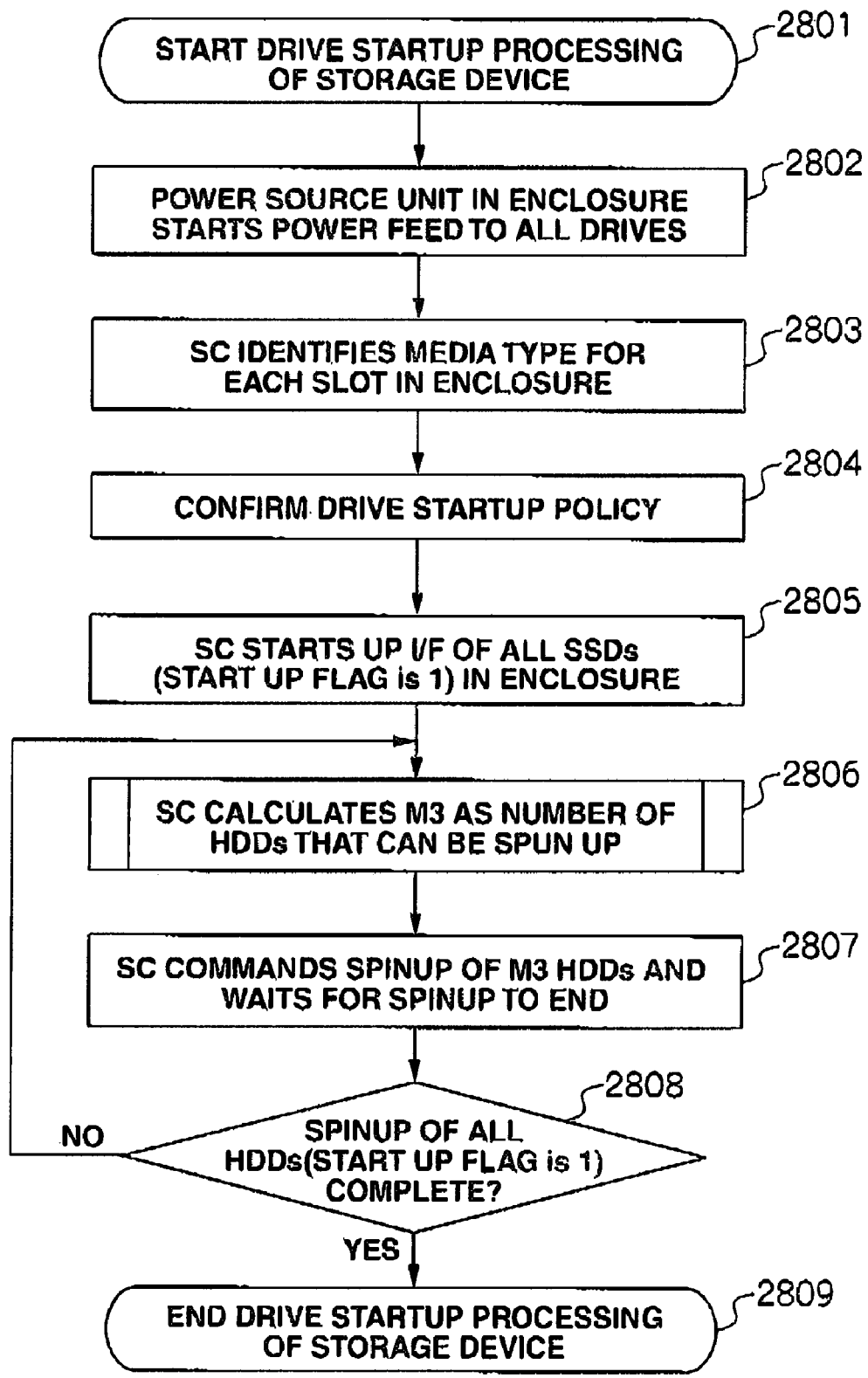
FIG. 28 is a flowchart explaining the drive startup method according to an embodiment of the present invention.
Figure 29:
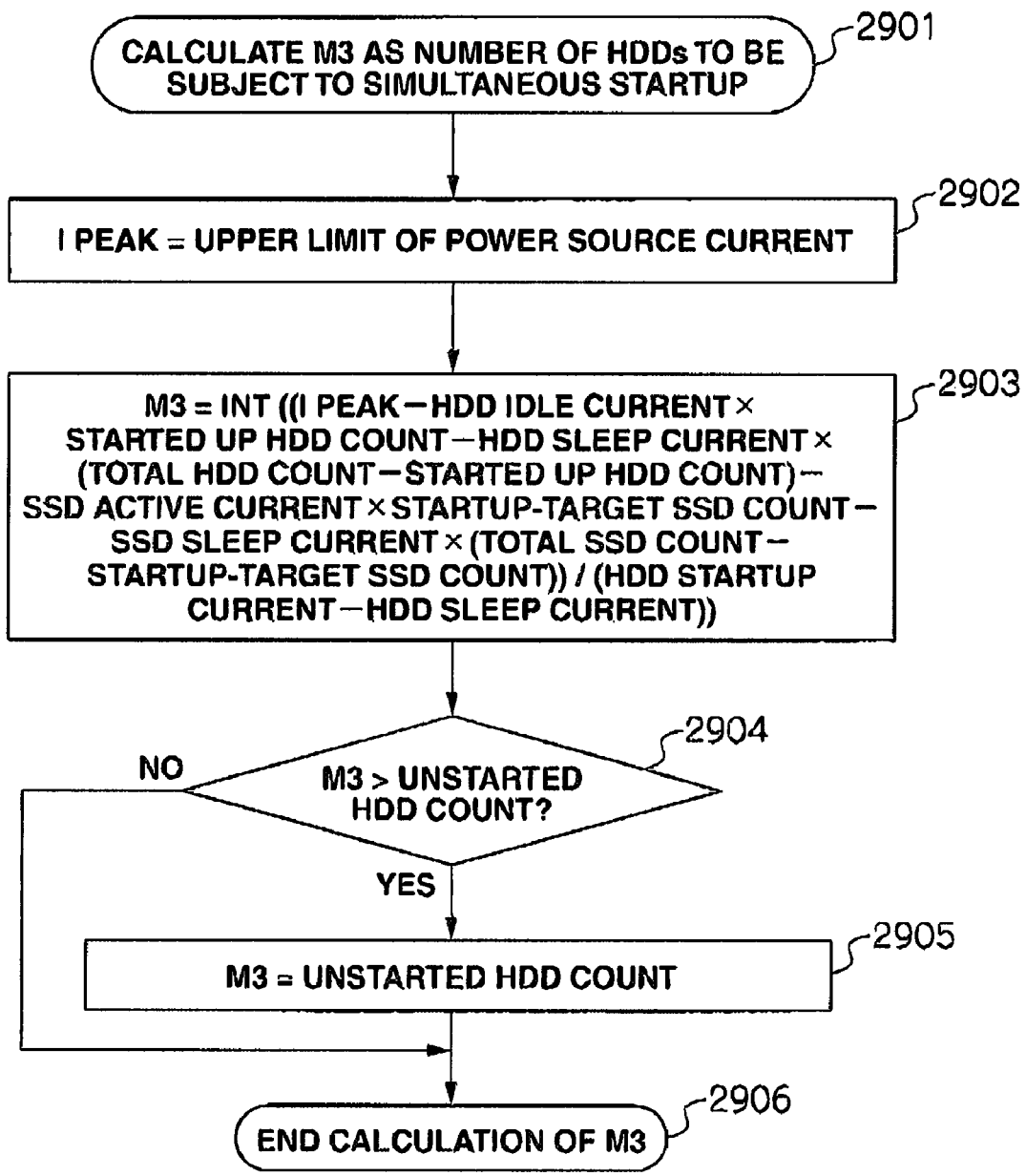
FIG. 29 is a flowchart explaining the method of determining the simultaneous startup HDD count according to an embodiment of the present invention.

FIG. 28 and FIG. 29 are flowcharts explaining the drive startup routine of the solid state drive preferential startup policy. Step 2801 to step 2804 are the same as steps 2401 to 2404 of FIG. 24, and the detailed explanation thereof is omitted.

At step 2805, the storage controller SC refers to the drive startup control management table 700, and the interface (enters the Phy Ready status) of the solid state drives in which the drive type is a solid state drive and the startup flag is 1.

At step 2806, the storage controller SC calculates the simultaneous startup hard disk drive count m3. This will be explained in detail later.

At step 2807, the storage controller SC commands the start of spinup processing of m3 hard disk drives, and waits for the spinup to end.

At step 2808 the storage controller SC determines whether the spinup processing of all hard disk drives having a startup flag of 1 is complete. The storage controller SC returns to step 2806 if the result is NO and proceeds to step 2809 if the result is YES.

The drive startup processing of the storage device is thereby complete (step 2809).

FIG. 29 is a flowchart explaining the routine for calculating the simultaneous startup hard disk drive count m3. At step 2806 of FIG. 28, the subroutine of step 2901 to step 2906 is called.

At step 2902, the maximum current value that can be supplied by the power source unit upon starting up the hard disk drives is substituted for I peak.

At step 2903, m3 as the number of hard disk drives that can be simultaneous started up is calculated according to the following formula.

$$m3=\text{int}((I\text{peak}-\text{HDD Idle current}\times\text{started up HDD count}-\text{HDD Sleep current}\times(\text{total HDD count}-\text{started up HDD count})-\text{SSD Active current}\times\text{startup-target SSD count}-\text{SSD Sleep current}\times(\text{total SSD count}-\text{startup-target SSD count}))/(\text{HDD Startup current}-\text{HDD Sleep current}))$$

Here, as the current consumption of the solid state drive, the current value during data access is used in anticipation of the storage controller SC starting its access to the solid state drive.

At step 2904, whether the simultaneous startup hard disk drive count m3 is greater than the unstarted hard disk drive count is determined. Here, the unstarted hard disk drive count includes only the startup-target drives in which the startup flag 704 of the drive startup control management table 700 is 1. The routine proceeds to step 2905 if the result is YES and proceeds to step 2906 if the result is NO.

At step 2905, the unstarted hard disk drive count is substituted for the simultaneous startup hard disk drive count m3.

The calculation processing of the simultaneous startup hard disk drive count m3 is thereby complete (step 2906). If a plurality of power supply voltages are to be supplied to the drives, the simultaneous startup hard disk drive count is calculated for each power supply voltage, and the minimum value among such number of hard disk drives is selected as the simultaneous startup hard disk drive count.

According to the embodiment explained above, the storage device loaded with hard disk drives P00 to P02, P10 to P12 and solid state drives P03 to P05, P13 to P15 is able to shorten the drive startup time and reduce the peak current consumption.

The present invention can be broadly applied to storage devices and their drive startup methods.

What is claimed is:

1. A storage device, comprising:
   a plurality of drives including a hard disk or a semiconductor memory; and
   a storage controller for controlling the plurality of drives;
   wherein the storage device further comprises a control unit for enabling the storage controller to individually control the availability of power delivery to a hard disk drive or a solid state drive included in the plurality of drives connected to the same power source; and
   wherein the storage controller identifies whether each drive included in the plurality of drives is a hard disk drive or a solid state drive before starting the spinup processing of a hard disk drive, determines the number of hard disk drives to be subject to simultaneous spinup for each of the plurality of drives based on the identification result, and executes drive startup processing for each of the plurality of drives.

2. The storage device according to claim 1,
   wherein power delivery to a solid state drive included in the plurality of drives is started after the spinup processing of all hard disk drives included in the plurality of drives is complete.

3. The storage device according to claim 1,
   wherein the storage controller controls the control unit and starts the spinup processing of the hard disk drive and the power delivery to the solid state drive according to a pre-set drive startup policy.

4. The storage device according to claim 3,
   wherein the pre-set drive startup policy is one among a first policy as a policy for minimizing the maximum value of current required for the drive startup, a second policy as a policy for preferentially starting up a hard disk drive, and a third policy as a policy for preferentially starting up a solid state drive.

5. The storage device according to claim 1,
   wherein the storage controller retains storage media type information of each drive included in the plurality of drives.

6. The storage device according to claim 1,
   wherein each of the plurality of drives is stored in at least one or more cartridges including a signal pin for outputting a storage media identification signal; and
   wherein the storage controller identifies the storage media type of each drive included in a plurality of drives stored in the at least one or more cartridges by determining the storage media identification signal.

7. The storage device according to claim 6,
   wherein the at least one or more cartridges detect a difference in the external form of a hard disk drive and a solid state drive and output the storage media identification signal to the storage controller.

8. The storage device according to claim 1,
   wherein the storage controller identifies the storage media type of each drive included in the plurality of drives based on a difference in the supply current of each drive including the plurality of drives before starting the spinup processing of a hard disk drive.

9. A storage device, comprising:
   a plurality of drives including a hard disk or a semiconductor memory; and
   a storage controller for controlling the plurality of drives;
   wherein the storage controller supplies power to each of the plurality of drives connected to the same power source, identifies whether each drive included in the plurality of drives is a hard disk drive or a solid state drive before starting the spinup processing of the hard disk drive, determines the number of hard disk drives included in the plurality of drives to be subject to simultaneous spinup based on the identification result, and executes drive startup processing for each of the plurality of drives.

10. The storage device according to claim 9,
    wherein the storage controller starts communication with an interface of a solid state drive included in the plurality of drives after the spinup processing of all hard disk drives included in the plurality of drives is complete.

11. The storage device according to claim 9,
    wherein the storage controller starts the spinup processing of a hard disk drive and the communication with an interface of a solid state drive according to a pre-set drive startup policy.

12. The storage device according to claim 11,
    wherein the pre-set drive startup policy is one among a first policy as a policy for minimizing the maximum value of current required for the drive startup, a second policy as a policy for preferentially starting up a hard disk drive, and a third policy as a policy for preferentially starting up a solid state drive.

13. The storage device according to claim 9,
    wherein the storage controller retains storage media type information of each drive included in the plurality of drives.

14. The storage device according to claim 9,
    wherein each of the plurality of drives is stored in at least one or more cartridges including a signal pin for outputting a storage media identification signal; and
    wherein the storage controller identifies the storage media type of each drive included in a plurality of drives stored in the at least one or more cartridges by determining the storage media identification signal.

15. The storage device according to claim 14,
    wherein the at least one or more cartridges detect a difference in the external form of a hard disk drive and a solid state drive and output the storage media identification signal to the storage controller.

16. The storage device according to claim 9,
    wherein the storage controller identifies the storage media type of each drive included in the plurality of drives based on a difference in the supply current of each drive including the plurality of drives before starting the spinup processing of a hard disk drive.

17. A drive startup method of a storage device comprising a plurality of drives including a hard disk or a semiconductor memory and a storage controller for controlling the plurality of drives, comprising:
- a step of the storage controller reading a drive startup policy set by a storage administrator;
- a step of the storage controller determining the storage media type of each drive included in the plurality of drives; and
- a step of the storage controller determining drive startup processing based on the determination result of the drive startup policy and the storage media identification.

18. The drive startup method of a storage device according to claim 17,
- wherein the drive startup policy includes a first policy as a policy for minimizing the maximum value of current required for the drive startup,
- wherein the drive startup method further comprises:
- a step of the storage controller sequentially executing the spinup processing of a hard disk drive upon setting the number of hard disk drives to one to be lastly subject to the spinup processing when the first policy is set by the storage administrator; and
- a step of starting the startup of a solid state drive after the spinup processing of a hard disk drive is complete.

19. The drive startup method of a storage device according to claim 17,
- wherein the drive startup policy includes a second policy as a policy for preferentially starting up a hard disk drive,
- wherein the drive startup method further comprises:
- a step of the storage controller calculating the number of hard disk drives, to which power can be delivered, to be subject to simultaneous spinup processing, when the second policy is set by the storage administrator.

20. The drive startup method of a storage device according to claim 17,
- wherein the drive startup policy includes a third policy as a policy for preferentially starting up a solid state drive,
- wherein the drive startup method further comprises:
- a step of the storage controller calculating the number of hard disk drives, to which power can be delivered, to be subject to simultaneous spinup processing after the startup of all solid state drives, when the third policy is set by the storage administrator.

* * * * *